US012621076B2

(12) United States Patent
Simsarian et al.

(10) Patent No.: US 12,621,076 B2
(45) Date of Patent: May 5, 2026

(54) ADD/DROP CAPABILITY FOR SPATIAL DIVISION MULTIPLEXED OPTICAL SYSTEMS

(71) Applicant: Nokia Solutions and Networks Oy, Espoo (FI)

(72) Inventors: John Simsarian, Highland Park, NJ (US); David Neilson, Old Bridge, NJ (US); Roland Ryf, Aberdeen, NJ (US)

(73) Assignee: Solutions and Networks Oy, Espoo (FI)

( * ) Notice: Subject to any disclaimer, the term of this patent is extended or adjusted under 35 U.S.C. 154(b) by 197 days.

(21) Appl. No.: 17/965,236

(22) Filed: Oct. 13, 2022

(65) Prior Publication Data

US 2024/0007215 A1    Jan. 4, 2024

Related U.S. Application Data

(60) Provisional application No. 63/357,068, filed on Jun. 30, 2022.

(51) Int. Cl.
*H04J 14/02* (2006.01)
*H04L 49/1515* (2022.01)

(52) U.S. Cl.
CPC ...... *H04J 14/0209* (2013.01); *H04J 14/0212* (2013.01); *H04L 49/1515* (2013.01)

(58) Field of Classification Search
None
See application file for complete search history.

(56) References Cited

U.S. PATENT DOCUMENTS 6,404,940 B1    6/2002 Tsuyama et al.
6,594,412 B2 * 7/2003 Maeda ................ H04J 14/0295
                                                   385/17

(Continued)

FOREIGN PATENT DOCUMENTS

JP          6622113 B2    12/2019
WO    WO 2003/081944 A1    10/2003

OTHER PUBLICATIONS

Jinno, M., "Spatial Channel Cross-Connect Architectures for Spatial Channel Networks," IEEE Journal of Selected Topics in Quantum Electronics, vol. 26, No. 4, Jul. 2020, 16 pages.

(Continued)

*Primary Examiner* — Jai M Lee
(74) *Attorney, Agent, or Firm* — Tong, Rea, Bentley & Kim, LLC

(57)    ABSTRACT

Various example embodiments for supporting optical transport systems are presented. Various example embodiments for supporting optical transport systems may be configured to support optical transport systems that support multiple fibers based on use of spatial division multiplexing (SDM) techniques. Various example embodiments for supporting optical transport systems that support multiple fibers based on use of SDM techniques may be configured to support optical transport systems that support multiple fibers based on use of an anylane add/drop capability that is based on use of a Clos architecture (e.g., a spatially-switched distributed Clos architecture with a single stage of switching for network traffic that passes through the node, a spatially-switched distributed Clos architecture with two stages of switching for network traffic that passes through the node, a spatially-switched node-contained Clos architecture with three stages of switching for network traffic that passes through the node, or the like).

12 Claims, 17 Drawing Sheets

(56) References Cited

U.S. PATENT DOCUMENTS

| 7,043,160 | B1 * | 5/2006 | Graves | H04Q 11/0478 |
| | | | | 341/52 |
| 7,113,505 | B2 | 9/2006 | Williams | |
| 7,133,609 | B2 * | 11/2006 | Kim | H04J 14/0213 |
| | | | | 398/59 |
| 7,787,768 | B2 * | 8/2010 | Pichler | H04Q 11/0005 |
| | | | | 398/56 |
| 8,725,001 | B2 * | 5/2014 | Fini | H04J 14/052 |
| | | | | 398/145 |
| 9,130,692 | B2 * | 9/2015 | Jenkins | H04J 14/0204 |
| 9,160,478 | B2 * | 10/2015 | Roorda | H04Q 11/0005 |
| 9,166,722 | B2 * | 10/2015 | Searcy | H04B 10/0779 |
| 9,215,028 | B1 * | 12/2015 | Mehrvar | H04Q 11/0005 |
| 9,344,779 | B2 * | 5/2016 | Sethumadhavan | H04J 14/0212 |
| 9,548,834 | B2 * | 1/2017 | Roorda | H04Q 11/0005 |
| 9,729,229 | B2 * | 8/2017 | Le Taillandier De Gabory | |
| | | | | H04B 10/6164 |
| 9,868,631 | B2 * | 1/2018 | Frankel | B81B 7/008 |
| 10,050,738 | B1 * | 8/2018 | Akasaka | H04J 14/02216 |
| 10,382,843 | B2 * | 8/2019 | Xia | H04J 14/02122 |
| 10,527,781 | B2 * | 1/2020 | Oda | G02B 6/26 |
| 2014/0140694 | A1 * | 5/2014 | Zhou | H04Q 11/0005 |
| | | | | 398/44 |
| 2014/0219657 | A1 * | 8/2014 | Simonneau | H04Q 11/0005 |
| | | | | 398/49 |
| 2018/0102865 | A1 * | 4/2018 | Li | H04Q 11/0005 |
| 2022/0014301 | A1 * | 1/2022 | Senoo | H04J 14/0212 |

OTHER PUBLICATIONS

Jinno, M., et al., "Enhancing the flexibility and functionality of SCNs: demonstration of evolution toward any-core-access, nondirectional, and contentionless spatial channel cross-connects," Journal of Optical Communications and Networking, vol. 13, No. 8, Aug. 2021, 13 pages.

Jinno, M., et al., "Feasibility Demonstration of Spatial Channel Networking Using SDM/WDM Hierarchical Approach for Peta-b/s Optical Transport," Journal of Lightwave Technology, vol. 38, No. 9, May 2020, 10 pages.

* cited by examiner

FIG.　3

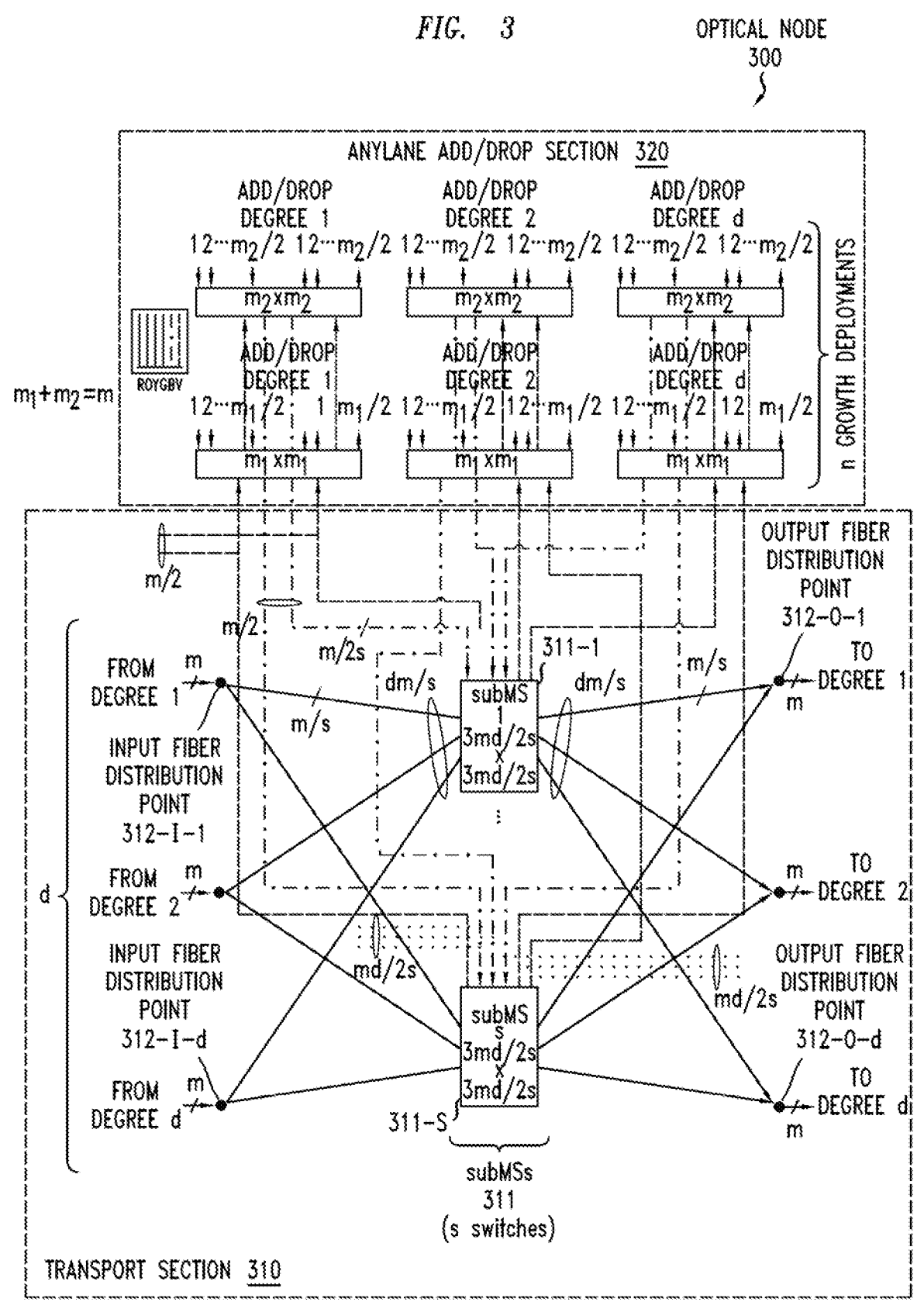

OPTICAL NODE
300

ANYLANE ADD/DROP SECTION　320

ADD/DROP
DEGREE 1

ADD/DROP
DEGREE 2

ADD/DROP
DEGREE d $12\cdots m_2/2$　$12\cdots m_2/2$　$12\cdots m_2/2$　$12\cdots m_2/2$　$12\cdots m_2/2$　$12\cdots m_2/2$ $m_2 \times m_2$　$m_2 \times m_2$　$m_2 \times m_2$

ROYGBV

ADD/DROP
DEGREE 1

ADD/DROP
DEGREE 2

ADD/DROP
DEGREE d $m_1 + m_2 = m$ $12\cdots m_1/2$　$1\;m_1/2$　$12\cdots m_1/2$　$12\cdots m_1/2$　$12\cdots m_1/2$　$12\;m_1/2$ $m_1 \times m_1$　$m_1 \times m_1$　$m_1 \times m_1$ n GROWTH DEPLOYMENTS

OUTPUT FIBER
DISTRIBUTION
POINT
312-O-1

$m/2$ $m/2$ $m/2s$ 311-1

FROM
DEGREE 1　$m$ $m/s$ $dm/s$ subMS
1

$dm/s$ $m/s$

TO
DEGREE 1
$m$

INPUT FIBER
DISTRIBUTION
POINT
312-I-1

$3md/2s$
×
$3md/2s$

FROM
DEGREE 2　$m$ $m$　TO
DEGREE 2

INPUT FIBER
DISTRIBUTION
POINT
312-I-d $md/2s$ $md/2s$

OUTPUT FIBER
DISTRIBUTION
POINT
312-O-d

FROM
DEGREE d　$m$ subMS
s $3md/2s$
×
$3md/2s$

311-S

TO
DEGREE d
$m$ d subMSs
311
(s switches)

TRANSPORT SECTION　310

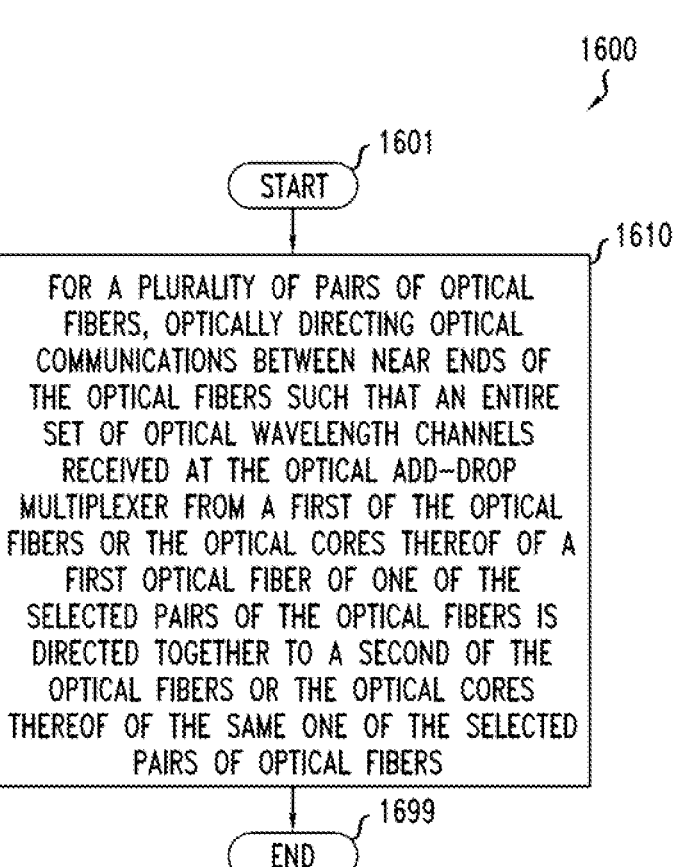

START  1601

1610

FOR A PLURALITY OF PAIRS OF OPTICAL FIBERS, OPTICALLY DIRECTING OPTICAL COMMUNICATIONS BETWEEN NEAR ENDS OF THE OPTICAL FIBERS SUCH THAT AN ENTIRE SET OF OPTICAL WAVELENGTH CHANNELS RECEIVED AT THE OPTICAL ADD-DROP MULTIPLEXER FROM A FIRST OF THE OPTICAL FIBERS OR THE OPTICAL CORES THEREOF OF A FIRST OPTICAL FIBER OF ONE OF THE SELECTED PAIRS OF THE OPTICAL FIBERS IS DIRECTED TOGETHER TO A SECOND OF THE OPTICAL FIBERS OR THE OPTICAL CORES THEREOF OF THE SAME ONE OF THE SELECTED PAIRS OF OPTICAL FIBERS

END  1699

ADD/DROP CAPABILITY FOR SPATIAL DIVISION MULTIPLEXED OPTICAL SYSTEMS

CROSS-REFERENCE TO RELATED APPLICATIONS

This application claims the benefit of U.S. Provisional Patent Application Ser. No. 63/357,068, filed on Jun. 30, 2022, which is hereby incorporated herein by reference in its entirety.

TECHNICAL FIELD

Various example embodiments relate generally to optical systems and, more particularly but not exclusively, to spatial division multiplexed optical systems.

BACKGROUND

In optical systems, wavelength division multiplexing (WDM) may be employed to multiplex multiple optical carrier signals onto a single optical fiber using different wavelengths. In an WDM-based optical system, reconfigurable optical add/drop multiplexers (ROADMs) may be used to switch traffic from the WDM-based optical system at the wavelength level, thereby allowing individual wavelengths or multiple wavelengths to be added to and/or dropped from transport fibers without having to convert the signals to electronic signals and back to optical signals. Many ROADM-based WDM optical systems add and drop wavelengths using a colorless, directionless, contentionless, and flexible (CDCF) add/drop section architecture such that an optical signal plugged into any port of the CDCF add/drop section can have any wavelength (i.e., colorless) and can go in any direction (i.e., directionless), without wavelength contention (i.e., contentionless).

In optical systems, the Shannon capacity limit of certain bands (e.g., the "conventional wavelength" communication band (C band) and the "long wavelength" communication band (L band)) is being approached. In order to support future capacity growth as the Shannon capacity limit of such bands is approached, many optical networks will be scaling in the spatial domain based on use of multiple fibers and/or multiple cores per fiber. This scaling in the spatial domain based on use of multiple fibers and/or multiple cores per fiber will provide multiple parallel paths between nodes. This provides a new dimension to optical transport networks that needs to be properly designed, configured, controlled, and managed in order to support increased capacity in optical systems.

SUMMARY

In at least some example embodiments, an apparatus includes an optical add-drop multiplexer configured to optically switch optical communications between near ends of optical fibers or optical cores such that, for selected pairs of the optical fibers, an entire set of optical wavelength channels received at the optical add-drop multiplexer from a first of the optical fibers or the optical cores thereof of each one of the selected pairs of the optical fibers is directed together to a second of the optical fibers or the optical cores thereof of the same one of the selected pairs of the optical fibers. In at least some example embodiments, the optical add-drop multiplexer is configured to selectively drop an entire set of optical wavelength channels received from selected ones of the optical fibers or the optical cores thereof and to add sets of optical wavelength channels to selected others of the optical fibers or the optical cores thereof such that the added sets are the wavelength channels carried by the selected others. In at least some example embodiments, the optical add-drop multiplexer includes a multi-stage structure of optical switches therein. In at least some example embodiments, the multi-stage structure includes a Clos network of optical switches. In at least some example embodiments, the multi-stage structure includes, at least, a first ingress and/or egress layer of optical switches, a second ingress and/or egress layer of optical switches, and a first intermediate layer of optical switches connecting the first and second ingress and/or egress layers of optical switches. In at least some example embodiments, the multi-stage structure includes a second intermediate layer of optical switches connecting the first intermediate layer of optical switches to the second ingress and/or egress layer of optical switches. In at least some example embodiments, the apparatus further includes the optical fibers and a plurality of optical transceivers, each optical transceiver being connected to receive and transmit optical signals to a remote end of a corresponding pair of the optical fibers or a corresponding pair of the optical cores over a plurality of optical wavelength channels.

In at least some example embodiments, a method of directing wavelength division multiplexed sets of optical signals between nearby ends of optical fibers at an optical add-drop multiplexer includes, for a plurality of pairs of optical fibers, optically directing optical communications between near ends of the optical fibers such that an entire set of optical wavelength channels received at the optical add-drop multiplexer from a first of the optical fibers or the optical cores thereof of a first optical fiber of one of the selected pairs of the optical fibers is directed together to a second of the optical fibers or the optical cores thereof of the same one of the selected pairs of optical fibers. In at least some example embodiments, the method further includes at the add-drop multiplexer, selectively dropping an entire set of optical wavelength channels received from selected ones of the optical fibers or the optical cores thereof, and, at the add-drop multiplexer, adding sets of optical wavelength channels to selected others of the optical fibers or the optical cores thereof such that the added sets are the wavelength channels carried by the selected others. In at least some example embodiments, the optically directing includes transmitting the optical communications through a multi-stage structure of optical switches. In at least some example embodiments, the multi-stage structure includes a Clos network of optical switches. In at least some example embodiments, the optically directing includes optically transmitting the optical communications through a first ingress and/or egress layer of optical switches, a second ingress and/or egress layer of optical switches, and a first intermediate layer of optical switches connecting the first and second ingress and/or egress layers of optical switches. In at least some example embodiments, the optically directing includes directing the optical communications through a second intermediate layer of optical switches connecting the first intermediate layer of optical switches to the second ingress and/or egress layer of optical switches. In at least some example embodiments, the method further includes communicating, by at least one of a plurality of optical transceivers, optical signals to a remote end of a corresponding pair of the optical fibers or a corresponding pair of the optical cores over a plurality of optical wavelength channels.

BRIEF DESCRIPTION OF THE DRAWINGS

The teachings herein can be readily understood by considering the following detailed description in conjunction with the accompanying drawings, in which:

FIG. 3 depicts an example embodiment of an optical node configured to support an anylane add/drop capability for SDM systems using a distributed Clos architecture with a single stage of switching for network traffic that passes through the optical node;

FIG. 16 depicts an example embodiment of a method for use in optically directing optical communications between optical fibers.

To facilitate understanding, identical reference numerals have been used herein, wherever possible, in order to designate substantially similar or identical elements that are common among the various figures.

DETAILED DESCRIPTION

Figure 1:
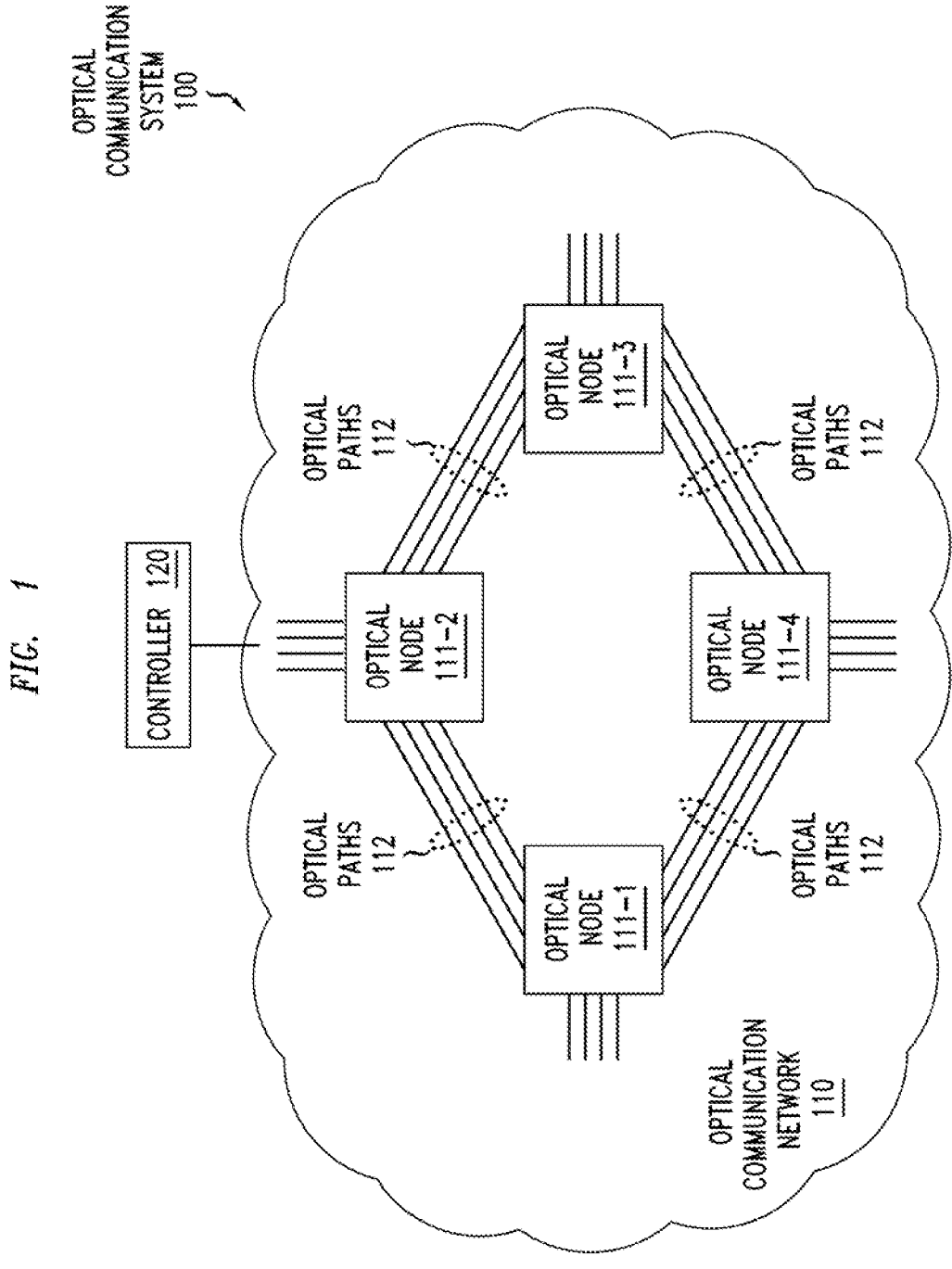
FIG. 1 depicts an example embodiment of an optical communication system configured to support an anylane add/drop capability for SDM in a manner that supports switching of optical communications between optical fibers and/or cores of optical fibers.

Various example embodiments for supporting optical transport systems are presented. Various example embodiments for supporting optical transport systems may be configured to support optical transport systems that support multiple fibers. Various example embodiments for supporting optical transport systems that support multiple fibers may be configured to support optical transport systems that support multiple fibers based on use of spatial division multiplexing (SDM) techniques. Various example embodiments for supporting optical transport systems that support multiple fibers based on use of SDM techniques may be configured to support optical transport systems that support multiple fibers based on use of an anylane add/drop capability. Various example embodiments for supporting optical transport systems that support multiple fibers based on use of an anylane add/drop capability may be configured to support the anylane add/drop capability based on use of a Clos architecture (e.g., a spatially-switched distributed Clos architecture with a single stage of switching for network traffic that passes through the node, a spatially-switched distributed Clos architecture with two stages of switching for network traffic that passes through the node, a spatially-switched node-contained Clos architecture with three stages of switching for network traffic that passes through the node, or the like, as well as various combinations thereof). Various example embodiments for supporting optical transport systems that support multiple fibers based on use of an anylane add/drop capability may be configured to support the anylane add/drop capability where the multiple spatial lanes may be provided in various ways (e.g., using cables that bundle multiple strands of uncoupled single-mode fibers, using fibers that include multiple uncoupled cores, or the like, as well as various combinations thereof). It will be appreciated that these and various other example embodiments and advantages or potential advantages of supporting optical transport systems that support multiple fibers based on use of an anylane add/drop capability may be further understood by way of reference to the following description and the associated figures which are discussed further below.

In optical systems, wavelength division multiplexing (WDM) may be employed to multiplex multiple optical carrier signals onto a single optical fiber using different wavelengths. In an WDM-based optical system, reconfigurable optical add/drop multiplexers (ROADMs) may be used to switch traffic from the WDM-based optical system at the wavelength level, thereby allowing individual wavelengths or multiple wavelengths to be added to and/or dropped from transport fibers without having to convert the signals to electronic signals and back to optical signals. Many ROADM-based WDM optical systems add and drop wavelengths using a colorless, directionless, contentionless, and flexible (CDCF) add/drop section architecture such that an optical signal plugged into any port of the CDCF add/drop section can have any wavelength (i.e., colorless) and can go in any direction (i.e., directionless), without wavelength contention (i.e., contentionless).

In optical systems, the Shannon capacity limit of certain bands (e.g., the "conventional wavelength" communication band (C band) and the "long wavelength" communication band (L band)) is being approached. In order to support future capacity growth as the Shannon capacity limit of such bands is approached, many optical networks will be scaling in the spatial domain based on use of multiple fibers and/or multiple cores per fiber. This scaling in the spatial domain based on use of multiple fibers and/or multiple cores per fiber will provide multiple parallel paths between nodes. These multiple parallel paths between nodes are referred to herein as "lanes" and various example embodiments presented herein may be configured to support the addition of an "anylane" capability to the add/drop section where the anylane add/drop is configured such that optical signals can be plugged into any port of the add/drop section and can be added and/or dropped to any fiber (i.e., lane). The implementation of the anylane capability in the add/drop section of an optical node simplifies management of the optical node since specific add/drop ports do not need to be assigned to certain fibers to guarantee reachability to transponders on other optical nodes. The implementation of the anylane capability in the add/drop section of an optical node also supports flexible optical networking since optical signals can be rerouted on different fibers and directions as needed. The implementation of the anylane capability in the add/drop section of an optical node also reduces the blocking probability of paths between transponders.

Various example embodiments presented herein may be configured to support capacity growth in optical systems. Various example embodiments presented herein may be configured to support a practical and scalable solution for capacity growth in optical systems, even as such optical systems approach the Shannon capacity limit of various communication bands (e.g., the C band and the L band), based on use of parallel fibers to create more interconnection between nodes. Various example embodiments presented herein may be configured to improve optical network capacity (and, thus, support present and future optical network capacity growth) in an efficient manner by using the multiplexing of multiple spatial lanes, e.g., fibers, such that optical signals on any add/drop fiber can be routed to any fiber lane in any direction. This functionality reduces the probability of blocking due to fiber paths being unavailable between endpoints (e.g., without this capability, two nodes may have available transponders for carrying traffic, however, the nodes cannot communicate with one another due to the particular add/drop fibers to which the transponders are connected and, thus, manual node configurations would be required to achieve reachability, thereby reducing the dynamic and flexible routing capabilities of the network and increasing operational expenditures (OPEX)). Various example embodiments presented herein may use modular spatial switches arranged in Clos configurations to achieve improved flexibility of node size (e.g., in terms of the number of fibers and degrees (directions) supported) and, thus, improved optical network capacity (and, therefore, support large optical network capacity growability).

Various example embodiments presented herein may be configured to support capacity growth in optical systems based on use of an anylane add/drop capability for SDM optical systems, where the anylane add/drop capability may be based on use of one or more types of Clos architectures. Various example embodiments for supporting an anylane add/drop capability for SDM optical systems based on use of Clos architectures may enable improved scaling of the number of switches by supporting aggregation of spectral capacity into spectral superchannels that are routed as larger units of bandwidth between endpoints. A spectral superchannel is a set of multiple wavelengths, ideally filling the entire amplifier bandwidth of the fiber. Then, the devices that route the spectral superchannel can be simple fiber switches without wavelength switching capability, thereby resulting in better scaling (i.e., a much slower increase) of the required number of switches versus the number of parallel fibers. This is because a wavelength selective switching based system requires two switches per fiber pair, whereas a fiber switch interconnects many fibers with a single device. The spatial switches are capable of routing multiple wavelengths (for example, superchannels with 100+ wavelengths in the C and L bands) on each fiber simultaneously, resulting in an enormous increase in capacity over solutions that switch individual wavelengths. The multi-stage Clos architecture can be contained in a single node, or distributed across multiple nodes to reduce the number of required switches.

Various example embodiments presented herein may be provided in various types of optical communication systems. FIG. 1 depicts an example embodiment of an optical communication system configured to support an anylane add/drop capability for SDM in a manner that supports switching of optical communications between optical fibers and/or cores of optical fibers. As depicted in FIG. 1, the optical communication system 100 includes an optical communication network 110 and a controller 120. The optical communication network 110 is configured to support optical communications. The optical communication includes four optical nodes 111-1 to 111-4 (collectively, optical nodes) interconnected by optical paths 112. The optical paths 112 may include single-mode optical fibers, cores of multi-core optical fibers, or the like, as well as various combinations thereof. In the optical communication network 110, one or more of the optical nodes 111 may include an optical add-drop multiplexer configured to optically switch optical communications between near ends of optical fibers or optical cores such that, for selected pairs of the optical fibers, an entire set of optical wavelength channels received at the optical add-drop multiplexer from a first of the optical fibers or the optical cores thereof of each one of the selected pairs of the optical fibers is directed together to a second of the optical fibers or the optical cores thereof of the same one of the selected pairs of the optical fibers. It will be appreciated that, although primarily presented with respect to specific numbers and arrangements of optical nodes 111 and optical paths 112, the optical communication network 110 may include various other numbers and/or arrangements of optical nodes 111 and/or various other numbers and/or arrangements of optical paths 112. The controller 120 is configured to provide control functions for the optical communication network 110. It will be appreciated that various example embodiments presented herein may be provided in various other types of optical communication systems.

Various example embodiments for supporting an anylane add/drop capability for SDM optical systems may be configured to support an optical node including an anylane add/drop section. In at least some example embodiments, an example embodiment of which is presented in FIG. 2, an anylane add/drop section may be applied to a stacked WDM system, which solves the disconnection problem between the multiple WDM transport systems. In at least some example embodiments, example embodiments of which are presented with respect to FIGS. 3-5, a spatially switched network may include optical nodes that include a Clos architecture and anylane add/drop sections. In at least some example embodiments, an example embodiment of which is presented in FIG. 3, an anylane add/drop capability for SDM optical systems may be supported using an anylane add/drop section for a spatially-switched distributed Clos architecture with a single stage of switching for network traffic that passes through the node. In at least some example embodiments, an example embodiment of which is presented in FIG. 4, an anylane add/drop capability for SDM optical systems may be supported using an anylane add/drop section for a spatially-switched distributed Clos architecture with two stages of switching for network traffic that passes through the node. In at least some example embodiments, an example embodiment of which is presented in FIG. 5, an anylane add/drop capability for SDM optical systems may be supported using an anylane add/drop for a spatially-switched node-contained Clos architecture with three stages of switching for network traffic that passes through the node (all three stages of the Clos architecture are disposed within the same node). It will be appreciated that, although primarily presented with respect to use of specific Clos architectures having specific numbers of stages, various other Clos architectures may be use with an anylane add/drop section to support an anylane add/drop capability for SDM optical systems.

Figure 2:
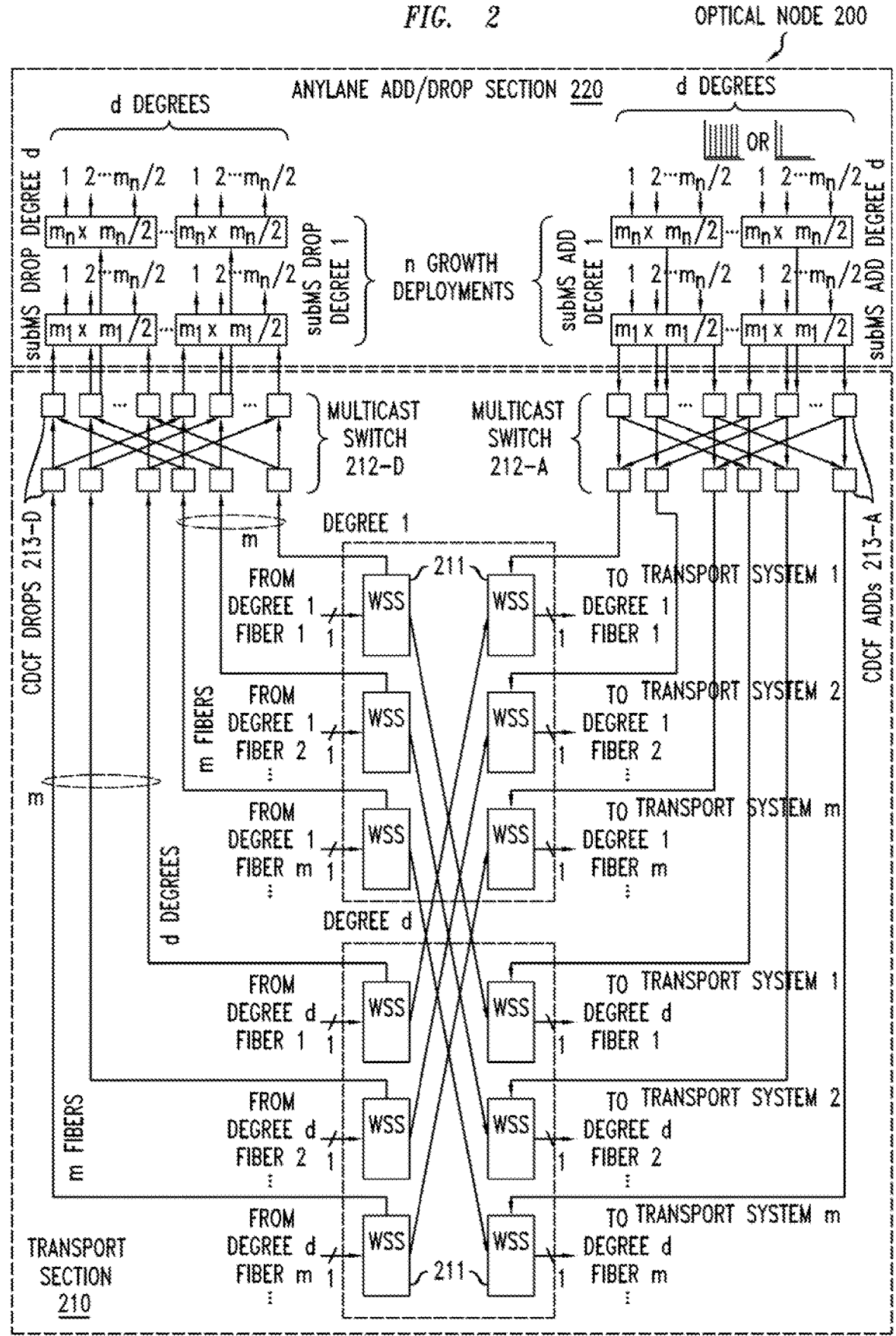
FIG. 2 depicts an example embodiment of a node configured to support an anylane add/drop capability for SDM optical systems using an anylane add/drop section for three disconnected and stacked WDM transport systems.

Various example embodiments for supporting an anylane add/drop capability for SDM optical systems may be configured to support an anylane add/drop section for three disconnected and stacked WDM transport systems, an example embodiment of which is presented in FIG. 2.

FIG. 2 depicts an example embodiment of an optical node configured to support an anylane add/drop capability for SDM optical systems using an anylane add/drop section for three disconnected and stacked WDM transport systems.

As depicted in FIG. 2, the optical node 200 includes a transport section 210 and an anylane add/drop section 220. The transport section 210 interfaces with optical fibers including input and output fibers (labelled as "From Degree x" and "To Degree x") where optical channels may be received over the input fibers and sent over the output fibers (illustratively, d degrees each supporting a maximum of m fibers). The transport section 210 also interfaces with the anylane add/drop section 220 for dropping optical channels received over input fibers of the transport section 210 and for adding optical channels to be sent over output fibers of the transport section 210.

As depicted in FIG. 2, the transport section 210 includes three disconnected and stacked WDM transport systems (denoted as Transport System 1, Transport System 2, and Transport System m) and multicast switches 212 which support interfacing between the WDM transport systems and the anylane add/drop section 220.

The WDM transport systems are WSS-based WDM transport systems, and, thus, include sets of WSSs 211 for switching wavelengths in various directions. The WDM transport systems each have d degrees (directions). As illustrated in FIG. 2, each of the m WDM transport systems includes a pair of WSSs 211 for each of the fibers (resulting in use of 2 d total WSSs in each of the WDM transport systems to support the d degrees within that WDM transport system) and, similarly, each of the degrees includes a pair of WSSs for each of the WDM transport systems (resulting in use of 2 m total WSS in each degree to support the m WDM transport systems within that degree).

The multicast switches 212 include a multicast switch 212-A for "adds" and a multicast switch 212-D for "drops" (and, thus, may be referred to collectively as multicast switches 212). The multicast switches 212 support CDCF add/drops 213 (illustratively, CDCF adds 213-A of multicast switch 212-A and CDCF drops 213-D of multicast switch 212-D). The CDCF add/drops 213 are directionless, in that wavelengths can be routed in any direction. The multicast switches 212 and associated CDCF add/drops 213 support routing of wavelengths between the transport section 210 and the anylane add/drop section 220.

As depicted in FIG. 2, anylane add/drop section 220 includes switches, referred to as subMSs, where "sub" refers to the fact that the architecture may employ multiple smaller switches, rather than a single large switch, which are configured to redirect optical signals carried by optical fibers from any input to any output. The anylane add/drop section 220 includes, for the drop side, n drop subMSs for each of the d degrees and, similarly, the anylane add/drop section 220 includes, for the add side, n add subMSs for each of the d degrees.

It will be appreciated that the WDM transport systems, as noted above, each have d degrees (directions); however, without the anylane add/drop section 220 that interconnects the different WDM transport systems, transponders plugged into different WDM transport systems would not be able to optically connect to each other. The inclusion of the subMSs in the anylane add/drop section 220 enables transponders to be plugged into any of the input/output ports of the anylane add/drop section 220 and to be added to any fiber (illustratively, the subMSs allow a transponder plugged into any add/drop port in the anylane add/drop section 220 to access any of the three transport systems (fibers) of the transport section 210). This allows for flexible and dynamic optical networking without manual provisioning. The input/output ports to the anylane add/drop section 220 can accept single wavelengths or spectral superchannels. The anylane add/drop section 220 is growable in that subMSs can be added as degrees are added without disrupting existing traffic.

It will be appreciated that, while primarily depicted with respect to use of separate subMSs for the add and drop sections, the add and drop sections for each degree can be combined into one subMS (as illustrated in the example embodiments of FIGS. 3 and 4) to reduce the number of required switches. As the amount of add/drop wavelengths increases, additional subMSs can be added (labelled as "n growth deployments" in FIG. 2), as long as the ports are available on the multicast switches of the WDM transport systems.

It will be appreciated that, while the anylane add/drop section 220 of FIG. 2 solves the problem of disconnection between the multiple WDM transport systems, it may not solve the rapid growth scaling problem as the number of fibers increases. Various example embodiments in which anylane add/drop may be used to support improved scalability of fibers are presented with respect to FIGS. 3-5, which illustrate various Clos space switching architectures which may be employed within the transport section of an optical node for improved scalability.

Various example embodiments for supporting an anylane add/drop capability for SDM optical systems may be configured to support anylane add/drop using a spatially-switched distributed Clos architecture with a single stage of switching for network traffic that passes through the node, an example embodiment of which is presented in FIG. 3.

FIG. 3 depicts an example embodiment of an optical node configured to support an anylane add/drop capability for SDM systems using a distributed Clos architecture with a single stage of switching for network traffic that passes through the optical node.

As depicted in FIG. 3, the optical node 300 includes a transport section 310 and an anylane add/drop section 320. The transport section 310 interfaces with optical fibers including input fibers and output fibers (labelled as "From Degree" and "To Degree") where optical channels may be received over the input fibers and sent over the output fibers (illustratively, d degrees each supporting a maximum of m fibers). The transport section 310 also interfaces with the anylane add/drop section 320 for dropping optical channels received over input fibers of the transport section 310 and for adding optical channels to be sent over output fibers of the transport section 310.

As depicted in FIG. 3, the transport section 310 includes a single stage of a multi-stage structure of optical switches in the form of a distributed Clos architecture (with a single stage of switching located within the optical node 300 for network traffic that passes through the optical node 300). More specifically, the transport section 310 includes a set of subMSs 311-1 to 311-s (which are referred to collectively as subMSs 311, and which also may be referred to herein as mid-stage subMSs or as intermediate switches or mid-stage switches) and a set of fiber distribution points 312 (illustratively, a set of input fiber distribution points 312-I-1 to 312-I-d (input fiber distribution points 312-I, which also may be referred to as ingress fiber distribution points) and a set of output fiber distribution points 312-O-1 to 312-O-d (output fiber distribution points 312-O, which also may be referred to as egress fiber distribution points)). It will be appreciated that the fiber distribution points 312 connect to subMSs which are disposed on other nodes (e.g., the input fiber distribution points 312-I may connect to subMSs disposed on a first optical node while the output fiber distribution points 312-O may connect to subMSs disposed on a second optical node), such that the multi-stage Clos architecture is distributed across multiple optical nodes.

The intermediate subMSs 311 for the network traffic are optical switches configured to support switching of optical channels between optical fibers associated with the fiber distribution points 312 and adds and drops from the anylane add/drop section 320. The intermediate subMSs 311 for the network traffic are deployed with a sufficient number of switches, s, to support a maximum number of fibers, m, and degrees, d. The multiple input and output fibers to and from every degree are shuffled across the intermediate subMSs 311 in sub-bundles of m/s fibers at the fiber distribution points 312.

The fiber distribution points 312 are not active or passive optical devices, but are simply locations where fibers are redirected in sub-bundles based on connection to the intermediate subMSs 311. For example, input fibers may be redirected from the input fiber distribution points 312-I to the intermediate subMSs 311 and output fibers may be redirected to the output fiber distribution points 312-O from the intermediate subMSs 311.

It is noted that the transport section 310 is referred to as a "distributed" Clos architecture because the Clos network spans across multiple adjacent nodes. The fact that the spatially switched layer is composed of fiber switches instead of wavelength-selective switches means that the increase in the number of required switches versus the number of fiber pairs per degree is over an order of magnitude lower when there is a large number of fibers, m, than for systems based on wavelength selective switches (e.g., as depicted in FIG. 2) where two WSSs are needed for every parallel fiber pair.

As depicted in FIG. 3, the anylane add/drop section 320 is composed of multiple subMSs that provide connectivity from and to every intermediate subMS 311 of the transport section 310 via bundles of m/2s fibers for an add/drop capacity of m/2. This allows connectivity from any input/output port of the anylane add/drop section 320 to any optical fiber of the transport section 310. The inputs/outputs to the anylane add/drop section 320 may include various types of optical channels and, in at least some example embodiments, ideally may be spectral superchannels that consume entire fiber amplifier bands. The anylane add/drop section 320 is growable in that subMSs can be added as degrees are added without disrupting existing traffic up to a maximum degree, $d_{max}$, and number of fibers, $f_{max}$, that the intermediate subMSs 311 are designed to accommodate. Additionally, as long as the intermediate subMSs 311 have been dimensioned to accept additional fibers, additional growth switches can be added in the anylane add/drop section 320 (denoted as "n growth deployments" in FIG. 3), without disrupting existing traffic.

Figure 4:
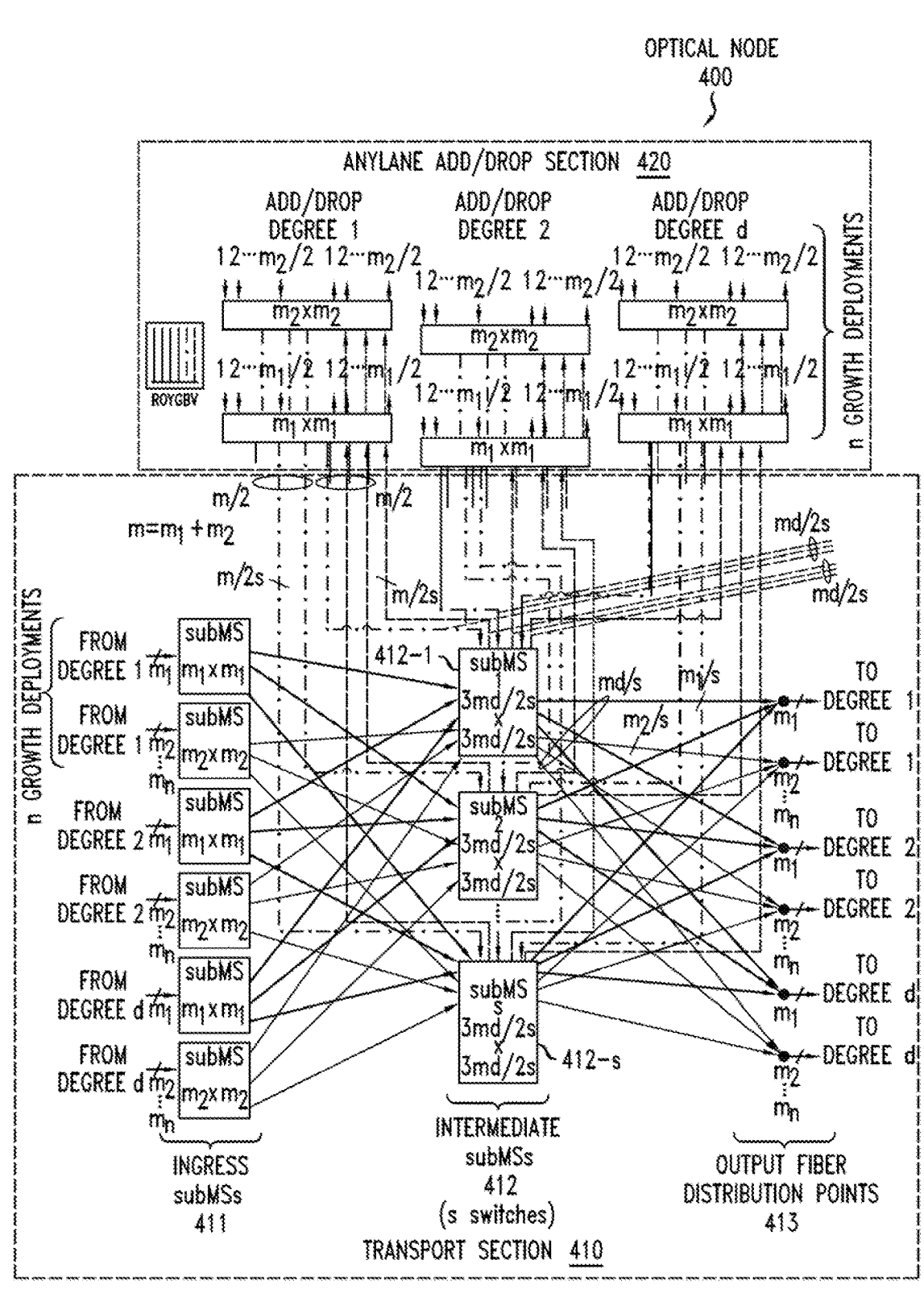
FIG. 4 depicts an example embodiment of an optical node configured to support an anylane add/drop capability for SDM optical systems using a spatially-switched distributed Clos architecture with two stages of switching for network traffic that passes through the optical node.

Various example embodiments for supporting an anylane add/drop capability for SDM optical systems may be configured to support anylane add/drop using a spatially-switched distributed Clos architecture with two stages of switching for network traffic that passes through the node, an example embodiment of which is presented in FIG. 4.

FIG. 4 depicts an example embodiment of an optical node configured to support an anylane add/drop capability for SDM optical systems using a spatially-switched distributed Clos architecture with two stages of switching for network traffic that passes through the optical node.

As depicted in FIG. 4, the optical node 400 includes a transport section 410 and an anylane add/drop section 420. The transport section 410 interfaces with optical fibers including input fibers and output fibers (labelled as "From Degree x" or "To Degree x") where optical channels may be received over the input fibers and sent over the output fibers (illustratively, d degrees each supporting a maximum of m fibers). The transport section 410 also interfaces with the anylane add/drop section 420 for dropping optical channels received over input fibers of the transport section 410 and for adding optical channels to be sent over output fibers of the transport section 410.

As depicted in FIG. 4, the transport section 410 includes a multi-stage structure of optical switches in the form of a spatially-switched distributed Clos architecture with two stages of switching for network traffic that passes through the node. More specifically, the transport section 410 includes a set of ingress subMSs 411 providing a first stage of switching, a set of intermediate subMSs 412-1 to 412-s (which are referred to collectively as intermediate subMSs 412, and which also may be referred to herein as intermediate subMSs or as intermediate switches or mid-stage switches) providing a second stage of switching, and a set of output fiber distribution points 413.

The ingress subMSs 411 support distribution of the sub-bundles of m/s fibers for the shuffle from the incoming fibers over the intermediate subMSs 412. As a result, a technician installing the node does not need to keep track of exactly which fibers in the incoming bundle connect to which of the intermediate subMSs 412 and there can be an automated procedure for the shuffle to the intermediate subMSs 412 to be established. Further as a result, this also gives the possibility for the shuffle to be changed; however, the ingress subMSs 411 are normally not rearranged for every connection that is created through the node. It is noted that ingress subMSs 411 can be added at the input for growing the degree or number of fibers without disrupting existing traffic as long as the intermediate subMSs 412 have ports reserved for the growth.

The intermediate subMSs 412 for the network traffic are optical switches configured to support switching of optical channels between input fibers associated with the ingress subMSs 411 and output fibers associated with output fiber distribution points 413. The intermediate subMSs 412 for the network traffic are optical switches configured to support switching of optical channels between optical fibers (input fibers associated with the ingress subMSs 411 and output fibers associated with the output fiber distribution points 413) and drops/adds that include drops to the anylane add/drop section 420 from input fibers of the transport section 410 and adds from the anylane add/drop section 420 to output fibers of the transport section 410 (and, thus, also may be referred to as fiber switches). The intermediate subMSs 412 for the network traffic are deployed with a sufficient number of switches, s, to support a maximum number of fibers, m, and degrees, d. The multiple input and output fibers to and from every degree are shuffled across the intermediate subMSs 412 in sub-bundles of m/s fibers.

The output fiber distribution points 413 are not active or passive optical devices, but are simply locations where fibers are redirected in sub-bundles for connection to the intermediate subMSs 412. The fact that the spatially switched layer is composed of fiber switches instead of wavelength-selective switches means that, for a large number of fibers, m, the increase in the number of required switches versus the number of fiber pairs per degree is over an order of magnitude lower than for systems based on wavelength selective switches (e.g., as depicted in FIG. 2) where two WSSs are needed for every parallel fiber pair.

As depicted in FIG. 4, the design and function of the anylane add/drop section 420 of FIG. 4 may be identical, or at least substantially similar, to the design and function of the anylane add/drop section 320 of FIG. 3. The anylane add/drop section 420 is composed of multiple subMSs that provide connectivity from and to every intermediate subMS 412 of the transport section 410 via bundles of m/2s fibers for an add/drop capacity of m/2. This allows connectivity from any input/output port of the anylane add/drop section 420 to any optical fiber of the transport section 410. The inputs/outputs to the anylane add/drop section 420 may include various types of optical channels and, in at least some example embodiments, ideally may be spectral super-channels that consume entire fiber amplifier bands. The anylane add/drop section 420 is growable in that subMSs can be added as degrees are added without disrupting existing traffic up to a maximum degree, dam, that the intermediate subMSs 412 are designed to accommodate. Additionally, as long as the intermediate subMSs 412 have been dimensioned to accept additional fibers, additional growth switches can be added in the anylane add/drop section 420 (denoted as "n growth deployments" in FIG. 4), without disrupting existing traffic.

Figure 5:
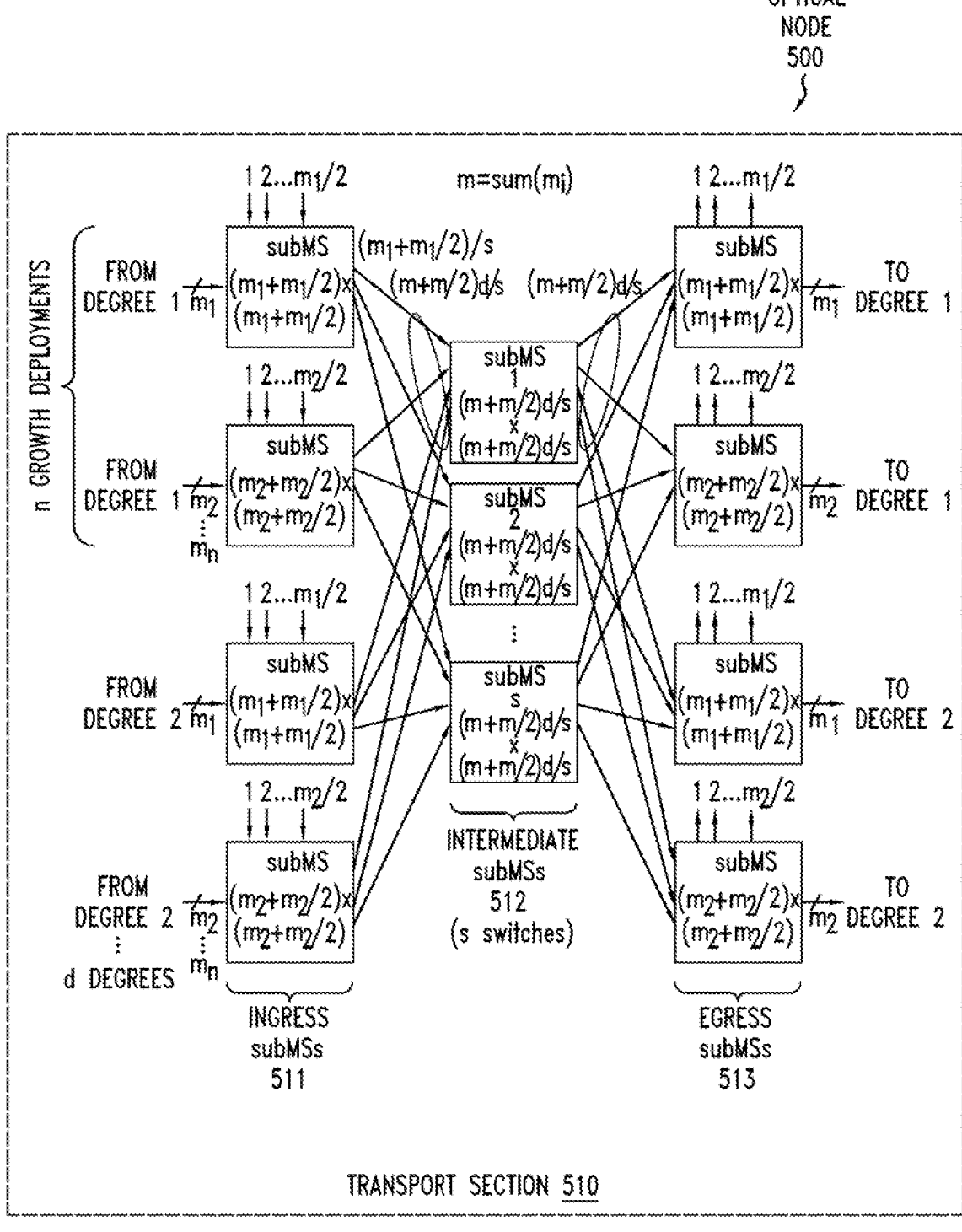
FIG. 5 depicts an example embodiment of an optical node configured to support an anylane add/drop capability for SDM optical systems using a spatially-switched node-contained Clos architecture with three stages of switching for network traffic that passes through the optical node and anylane add/drop through the input/output network facing switches.

Various example embodiments for supporting an anylane add/drop capability for SDM optical systems may be configured to support anylane add/drop using a spatially-switched node-contained Clos architecture with three stages of switching for network traffic that passes through the node and anylane add/drop through the input/output network facing switches, an example embodiment of which is presented in FIG. 5.

FIG. 5 depicts an example embodiment of an optical node configured to support an anylane add/drop capability for SDM optical systems using a spatially-switched node-contained Clos architecture with three stages of switching for network traffic that passes through the optical node and anylane add/drop through the input/output network facing switches.

As depicted in FIG. 5, the optical node 500 includes a transport section 510 and an anylane add/drop section (which has been integrated into the input and output Clos switches in FIG. 5). The transport section 510 interfaces with optical fibers including input fibers and output fibers (labelled as "From Degree x" and "To Degree x") where optical channels may be received over the input fibers and sent over the output fibers (illustratively, d degrees each supporting a maximum of m fibers).

As depicted in FIG. 5, the transport section 510 includes a multi-stage structure of optical switches in the form of a spatially-switched node-contained Clos architecture with three stages of switching for network traffic that passes through the node and anylane add/drop through the input/output network facing switches. More specifically, the transport section 510 includes a set of ingress subMSs 511 providing a first stage of switching, a set of intermediate subMSs 512-1 to 512-s (which are referred to collectively as intermediate subMSs 512, and which also may be referred to herein as mid-stage subMSs or as intermediate switches or mid-stage switches) providing a second stage of switching, and a set of egress subMSs 513 providing a third stage of switching.

The ingress subMSs 511 and the egress subMSs 513 provides anylane add and drop capability. In FIG. 5, since there are subMSs at both the inputs (namely, the ingress subMSs 511) and the outputs (namely, the egress subMSs) for network facing traffic, the add/drop traffic is placed directly on these switches, which results in anylane operation. Using the first and third stage switches for add/drop traffic reduces the total number of required switches compared to having additional switches for the add/drop traffic as in FIG. 3 and FIG. 4, although it will be appreciated that, in at least some example embodiments, additional switches may be provided for the add/drop traffic.

The ingress subMSs 511, in addition to supporting adds and drops, support distribution of the sub-bundles of m/s fibers for the shuffle from the incoming fibers over the intermediate subMSs 512. As a result, a technician installing the node does not need to keep track of exactly which fibers in the incoming bundle connect to which of the intermediate subMSs 512 and there can be an automated procedure for the shuffle to the intermediate subMSs 512 to be established. Further as a result, this also gives the possibility for the shuffle to be changed; however, the ingress subMSs 511 are normally not rearranged for every connection that is created through the node. It is noted that ingress subMSs 511 can be added at the input for growing the degree or number of fibers without disrupting existing traffic as long as the intermediate subMSs 512 have ports reserved for the growth.

The intermediate subMSs 512 for the network traffic are optical switches configured to support switching of optical channels between input fibers associated with the ingress subMSs 511 and output fibers associated with the egress subMSs 513. The intermediate subMSs 512 for the network traffic are optical switches configured to support switching of optical channels between optical fibers (input fibers associated with the ingress subMSs 511 and output fibers associated with the egress subMSs 513) and drops/adds. The intermediate subMSs 512 for the network traffic are deployed with a sufficient number of switches, s, to support a maximum number of fibers, m, and degrees, d. The multiple input and output fibers to and from every degree are shuffled across the intermediate subMSs 512 in sub-bundles of m/s fibers.

The egress subMSs 513, in addition to supporting adds and drops, support switching of the sub-bundles of m/s fibers for the shuffle over the intermediate subMSs 512 toward the outgoing fibers. As a result, a technician installing the node does not need to keep track of exactly which fibers in the outgoing bundle connect to which of the intermediate subMSs 512 and there can be an automated procedure for the shuffle from the intermediate subMSs 512 to be established. Further as a result, this also gives the possibility for the shuffle to be changed; however, the egress subMSs 513 are normally not rearranged for every connection that is created through the node. It is noted that egress subMSs 513 can be added at the output for growing the degree or number of fibers without disrupting existing traffic as long as the intermediate subMSs 512 have ports reserved for the growth.

In FIG. 5, as in the one-stage and two-stage Clos architectures of FIGS. 3 and 4, the intermediate subMSs 512 are initially deployed to support up to $m_{max}$ parallel fibers and $d_{max}$ degrees. Then, the ingress subMSs 511 and the output egress subMSs 513 can be added in pairs to grow the number of supported fibers or degrees without disrupting existing traffic. Due to the subMSs at the input and outputs of the node, this Clos architecture is self-contained to the node and, therefore, is not distributed between nodes. This isolation may provide convenience when provisioning the node, however, it is noted that there is an apparent overprovisioning of switches in that fibers on opposite ends of a span can be arbitrarily interchanged, which is a degree of freedom that does not reduce the blocking probability of paths through the network.

It will be appreciated that such example embodiments for supporting an anylane add/drop capability for SDM optical systems based on use of Clos architectures may obviate the need for use of stacked WDM solutions (e.g., where WDM systems are stacked on multiple parallel fibers, such as in FIG. 2). It is noted that such stacked WDM solutions may increase rapidly in cost, footprint, and power consumption as the number of parallel fibers increases, since wavelength switch components and amplifiers need to be deployed for every fiber). It is further noted that such stacked WDM solutions tend to have a limited degree of fiber connectivity such that parallel optical transport systems will be disconnected from each other as the number of parallel fibers grows. It is further noted that such stacked WDM systems tend to have low flexibility (parallel disconnected transport systems have low flexibility for dynamic optical networking because, even if transponders are available for a connection between two endpoints, the connection cannot be made if the transponders are on disconnected transport systems when there is no anylane add/drop section as in FIG. 2) and tend to require manual provisioning (to make such connections between transponders on disconnected transport systems, manual provisioning may be to physically move the transponders to the same transport system).

Figure 6:
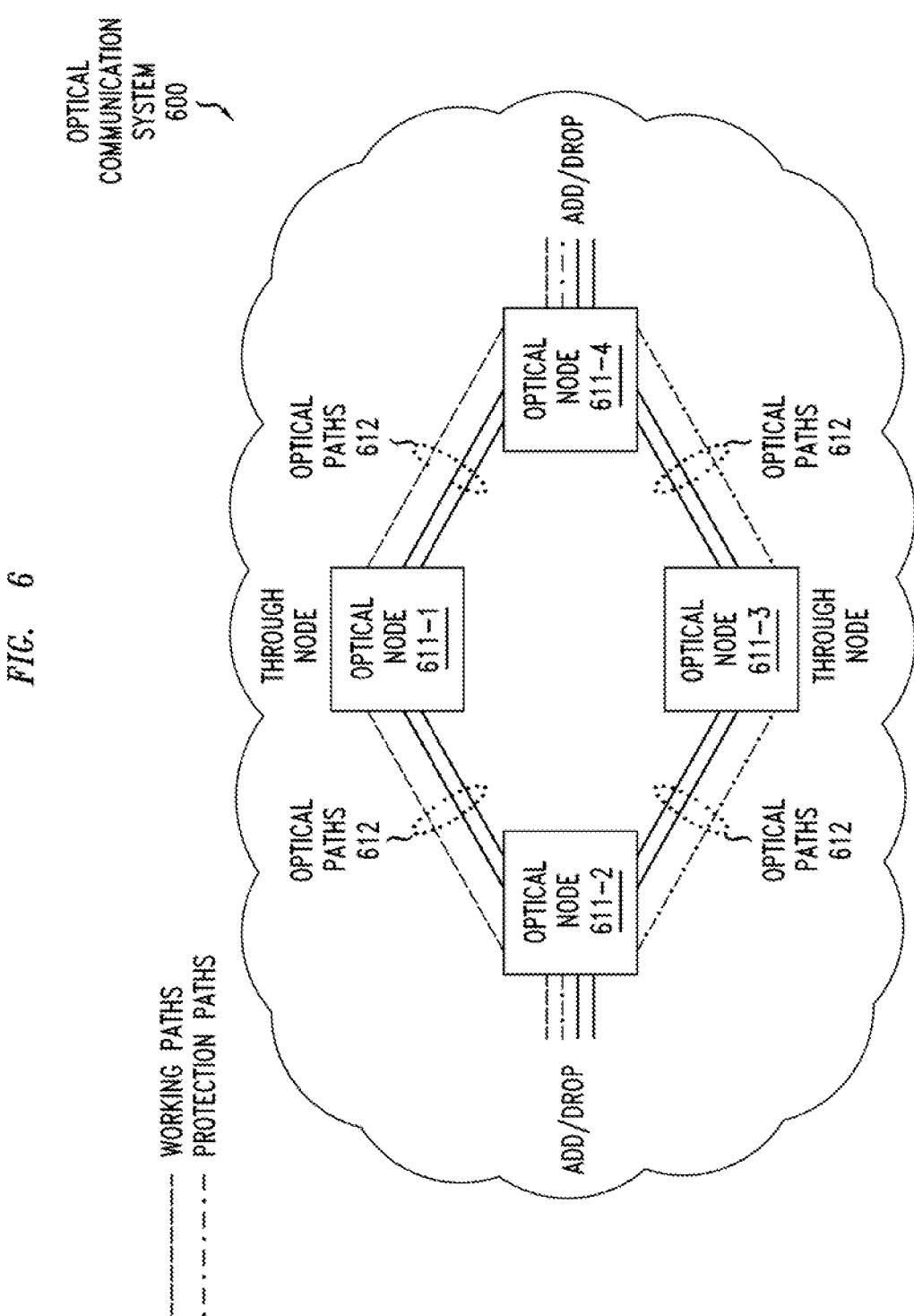
FIG. 6 depicts an example embodiment of an optical communication network configured to support an anylane add/drop capability for SDM in a manner that supports switching of optical communications between optical fibers and/or cores of optical fibers while supporting node diverse working and protection paths.

FIG. 6 depicts an example embodiment of an optical communication network configured to support an anylane add/drop capability for SDM in a manner that supports switching of optical communications between optical fibers and/or cores of optical fibers while supporting node diverse working and protection paths.

As depicted in FIG. 6, the optical communication network 600 includes four optical nodes 611-1 to 611-4 (collectively, optical nodes 611) interconnected by optical paths 612. The optical nodes 611 may include optical switches, optical add-drop multiplexers (e.g., ROADMs) or other suitable types of optical add/drop nodes, or the like, as well as various combinations thereof. The optical paths 612 may include single-mode optical fibers, cores of multi-core optical fibers, or the like, as well as various combinations thereof.

As depicted in FIG. 6, the optical nodes 611-2 and 611-4 operate as end nodes which support add/drop of optical signals transported on the optical paths 612 and the optical nodes 611-1 and 611-3 operate as through nodes which support propagation of the optical signals transported on the optical paths between the optical nodes 611-2 and 611-4.

As depicted in FIG. 6, the optical paths 612 include (1) a set of working paths transporting optical signals between the end optical nodes 611-2 and 611-4 and (2) a set of protection paths available for transporting optical signals between the end optical nodes 611-2 and 611-4 when the working paths transporting optical signals between the end optical nodes 611-2 and 611-4 are unavailable.

It will be appreciated that, ideally, working and protection paths should not be part of the same failure group (e.g., if a single component fails or a fiber bundle is cut, both working and protection paths should not be affected). In the example of FIG. 6, the working and protection paths are routed on node diverse paths (illustratively, the working paths are sent between the end optical nodes 611-2 and 611-4 via through optical node 611-1 and the protection paths are sent between the end optical nodes 611-2 and 611-4 via through optical node 611-3) and link diverse paths (illustratively, the working and protection paths are sent between the end optical nodes 611-2 and 611-4 over different optical paths 612). However, the end optical nodes 611-2 and 611-4 are the same for the working and protection paths, such that there is lack of path diversity at the endpoints of the working and protection paths.

It will be appreciated that various example embodiments for supporting diverse working and protection paths for add/drop traffic and through traffic, thereby providing end-to-end path diversity at the through optical nodes as well as the end optical nodes, are presented herein. For example, where the optical node 611 supports a Clos node for providing an anylane add/drop capability for SDM, various example embodiments may be configured to support diverse working and protection paths by routing working and protection paths on different switches and links within the Clos node of the optical node 611 (e.g., example embodiments for supporting diverse working and protection paths for add/drop traffic are presented with respect to FIGS. 7 and 8 and example embodiments for supporting diverse working and protection paths for through traffic are presented with respect to FIGS. 9 and 10). For example, where the optical node 611 supports a Clos node for providing an anylane add/drop capability for SDM, various example embodiments may be configured to support diverse working and protection paths by using redundant switches in the mid stage of the Clos node of the optical node 611 so that the protection switch can be used in the case of switch failure.

Figure 7:
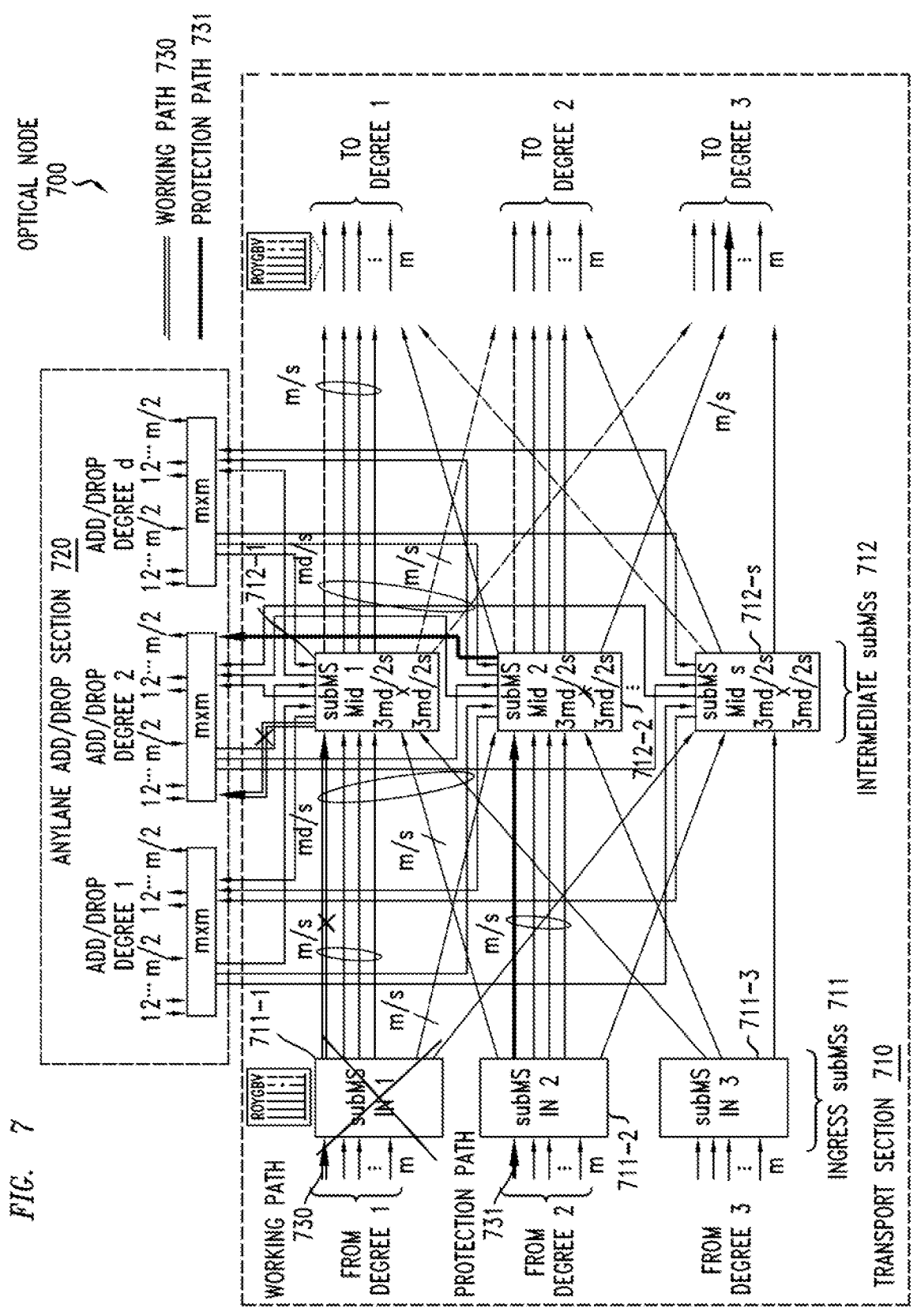
FIG. 7 depicts an example embodiment of an optical node, using a spatially-switched distributed Clos architecture with two stages of switching, that is configured to support add/drop traffic while supporting node diverse working and protection paths as presented in FIG. 6 where there is an input switch failure in the two-stage spatially-switched distributed Clos architecture.

FIG. 7 depicts an example embodiment of an optical node, using a spatially-switched distributed Clos architecture with two stages of switching, that is configured to support add/drop traffic while supporting node diverse working and protection paths as presented in FIG. 6 where there is an input switch failure in the two-stage spatially-switched distributed Clos architecture.

As depicted in FIG. 7, the optical node 700 includes a transport section 710 and an anylane add/drop section 720. The transport section 710 is spatially-switched distributed Clos architecture with two stages of switching (illustratively, using a set of ingress subMSs 711 and a set of intermediate subMSs 712), similar to the transport section 410 of the optical node 400 of FIG. 4. The anylane add/drop section 720 is similar to the anylane add/drop section 420 of the optical node 400 of FIG. 4.

As depicted in FIG. 7, the optical node 700 supports diverse working and protection paths including a working path 730 and an associated protection path 731. The working path 730 traverses the ingress subMS 711-1 and the intermediate subMS 712-1 that drops the working path 730 to the first ADD/DROP degree of the anylane add/drop section 720. The protection path 731 traverses the ingress subMS 711-2 and the intermediate subMS 712-2 that drops the protection path 731 to the second ADD/DROP degree of the anylane add/drop section 720.

As depicted in FIG. 7, the optical node 700 is configured to support add/drop traffic, while supporting node diverse working and protection paths, when there is an input switch failure in the two-stage spatially-switched distributed Clos architecture of the transport section 710. As depicted in FIG. 7, when the ingress subMS 711-1 fails (as indicated by the "X" through the node), the working path 730 is no longer propagated from the ingress subMS 711-1 to the intermediate subMS 712-1 (also denoted by an "X" on this section of the working path 730) or from the intermediate subMS 712-1 to the first ADD/DROP degree of the anylane add/drop section 720 (also denoted by an "X" on this section of the working path 730). However, despite the failure of the ingress subMS 711-1, the protection path 731 continues to flow via the ingress subMS 711-2 and the intermediate subMS 712-2 such that the associated optical signals may still be dropped at the optical node 700. Thus, the diverse routes for the working path 730 and the protection path 731 make these paths robust to input switch failure when optical signals are being dropped (or added).

Figure 8:
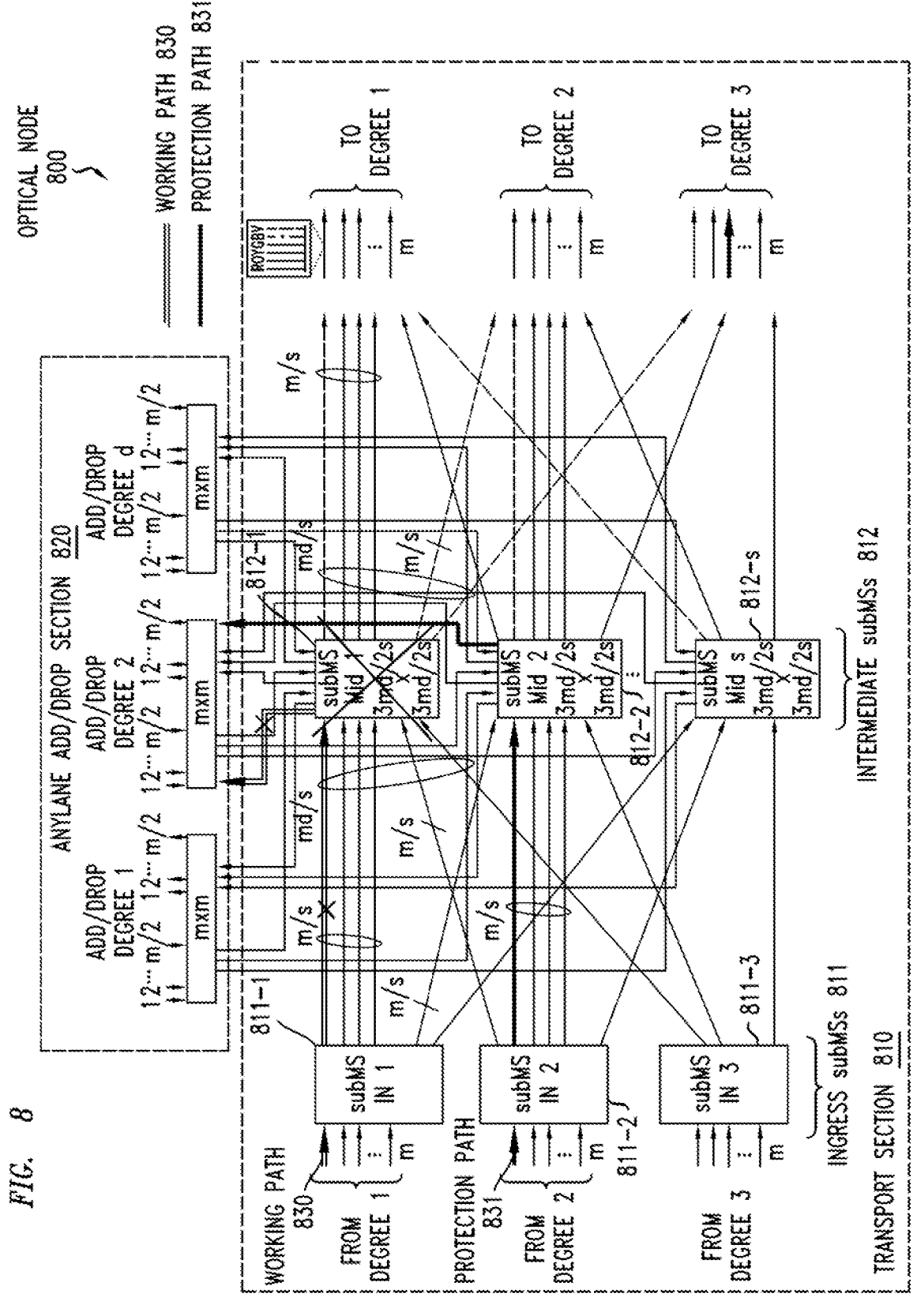
FIG. 8 depicts an example embodiment of an optical node, using a spatially-switched distributed Clos architecture with two stages of switching, that is configured to support add/drop traffic while supporting node diverse working and protection paths as presented in FIG. 6 where there is a mid-stage switch failure in the two-stage spatially-switched distributed Clos architecture.

FIG. 8 depicts an example embodiment of an optical node, using a spatially-switched distributed Clos architecture with two stages of switching, that is configured to support add/drop traffic while supporting node diverse working and protection paths as presented in FIG. 6 where there is a mid-stage switch failure in the two-stage spatially-switched distributed Clos architecture.

As depicted in FIG. 8, the optical node 800 includes a transport section 810 and an anylane add/drop section 820.

The transport section 810 is spatially-switched distributed Clos architecture with two stages of switching (illustratively, using a set of ingress subMSs 811 and a set of intermediate subMSs 812), similar to the transport section 410 of the optical node 400 of FIG. 4. The anylane add/drop section 820 is similar to the anylane add/drop section 420 of the optical node 400 of FIG. 4.

As depicted in FIG. 8, the optical node 800 supports diverse working and protection paths including a working path 830 and an associated protection path 831. The working path 830 traverses the ingress subMS 811-1 and the intermediate subMS 812-1 that drops the working path 830 to the first ADD/DROP degree of the anylane add/drop section 820. The protection path 831 traverses the ingress subMS 811-2 and the intermediate subMS 812-2 that drops the protection path 831 to the second ADD/DROP degree of the anylane add/drop section 820.

As depicted in FIG. 8, the optical node 800 is configured to support add/drop traffic, while supporting node diverse working and protection paths, when there is a mid-stage switch failure in the two-stage spatially-switched distributed Clos architecture of the transport section 810. As depicted in FIG. 8, when the intermediate subMS 812-1 fails (as indicated by the "X" through the node), the working path 830 is propagated from the ingress subMS 811-1 toward the intermediate subMS 812-1, but is no longer propagated from the intermediate subMS 812-1 to the first ADD/DROP degree of the anylane add/drop section 820 (also denoted by an "X" on this section of the working path 830). However, despite the failure of the intermediate subMS 812-1, the protection path 831 continues to flow via the ingress subMS 811-2 and the intermediate subMS 812-2 such that the associated optical signals may still be dropped at the optical node 800. Thus, the diverse routes for the working path 830 and the protection path 831 make these paths robust to mid-stage switch failure when optical signals are being dropped (or added).

Figure 9:
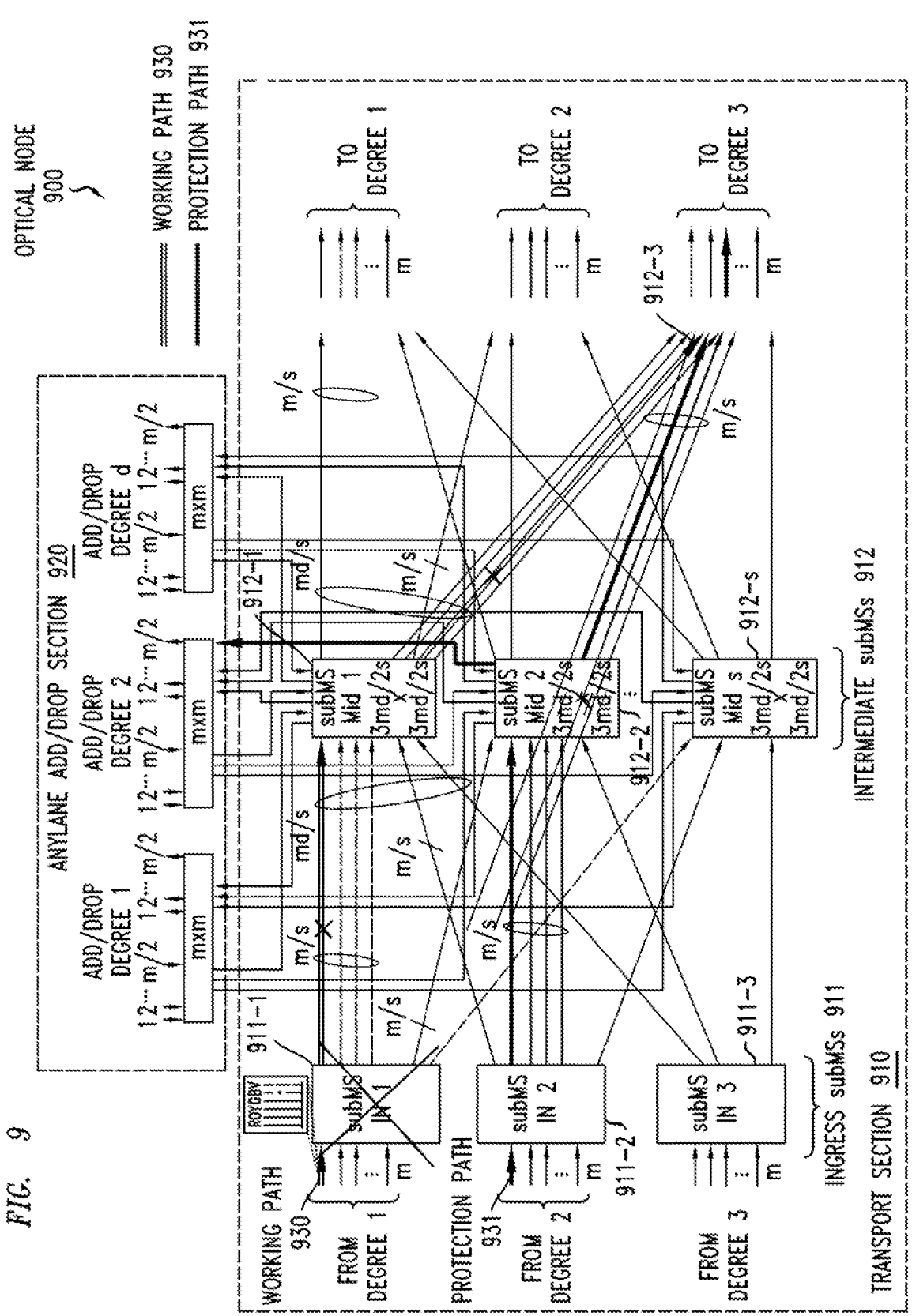
FIG. 9 depicts an example embodiment of an optical node, using a spatially-switched distributed Clos architecture with two stages of switching, that is configured to support through traffic while supporting node diverse working and protection paths as presented in FIG. 6 where there is an input switch failure in the two-stage spatially-switched distributed Clos architecture.

FIG. 9 depicts an example embodiment of an optical node, using a spatially-switched distributed Clos architecture with two stages of switching, that is configured to support through traffic while supporting node diverse working and protection paths as presented in FIG. 6 where there is an input switch failure in the two-stage spatially-switched distributed Clos architecture.

As depicted in FIG. 9, the optical node 900 includes a transport section 910 and an anylane add/drop section 920. The transport section 910 is spatially-switched distributed Clos architecture with two stages of switching (illustratively, using a set of ingress subMSs 911, a set of intermediate subMSs 912, and a set of output fiber distribution points 913), similar to the transport section 410 of the optical node 400 of FIG. 4. The anylane add/drop section 920 is similar to the anylane add/drop section 420 of the optical node 400 of FIG. 4.

As depicted in FIG. 9, the optical node 900 supports diverse working and protection paths including a working path 930 and an associated protection path 931. The working path 930 traverses the ingress subMS 911-1 and the intermediate subMS 912-1 that directs the working path 930 to the third output fiber distribution point 913-3. The protection path 931 traverses the ingress subMS 911-2 and the intermediate subMS 912-2 that directs the working path 930 to the third output fiber distribution point 913-3.

As depicted in FIG. 9, the optical node 900 is configured to support through traffic, while supporting node diverse working and protection paths, when there is an input switch failure in the two-stage spatially-switched distributed Clos architecture of the transport section 910. As depicted in FIG.

9, when the ingress subMS 911-1 fails (as indicated by the "X" through the node), the working path 930 is no longer propagated from the ingress subMS 911-1 to the intermediate subMS 912-1 (also denoted by an "X" on this section of the working path 930) or from the intermediate subMS 912-1 to the third output fiber distribution point 913-3 (also denoted by an "X" on this section of the working path 930). However, despite the failure of the ingress subMS 911-1, the protection path 931 continues to flow via the ingress subMS 911-2 and the intermediate subMS 912-2 such that the associated optical signals may still pass through the optical node 900 and exist the optical node 900 via the third output fiber distribution point 913-3 of the optical node 900. Thus, the diverse routes for the working path 930 and the protection path 931 make these paths robust to input switch failure for optical signals passing through the optical node 900.

Figure 10:
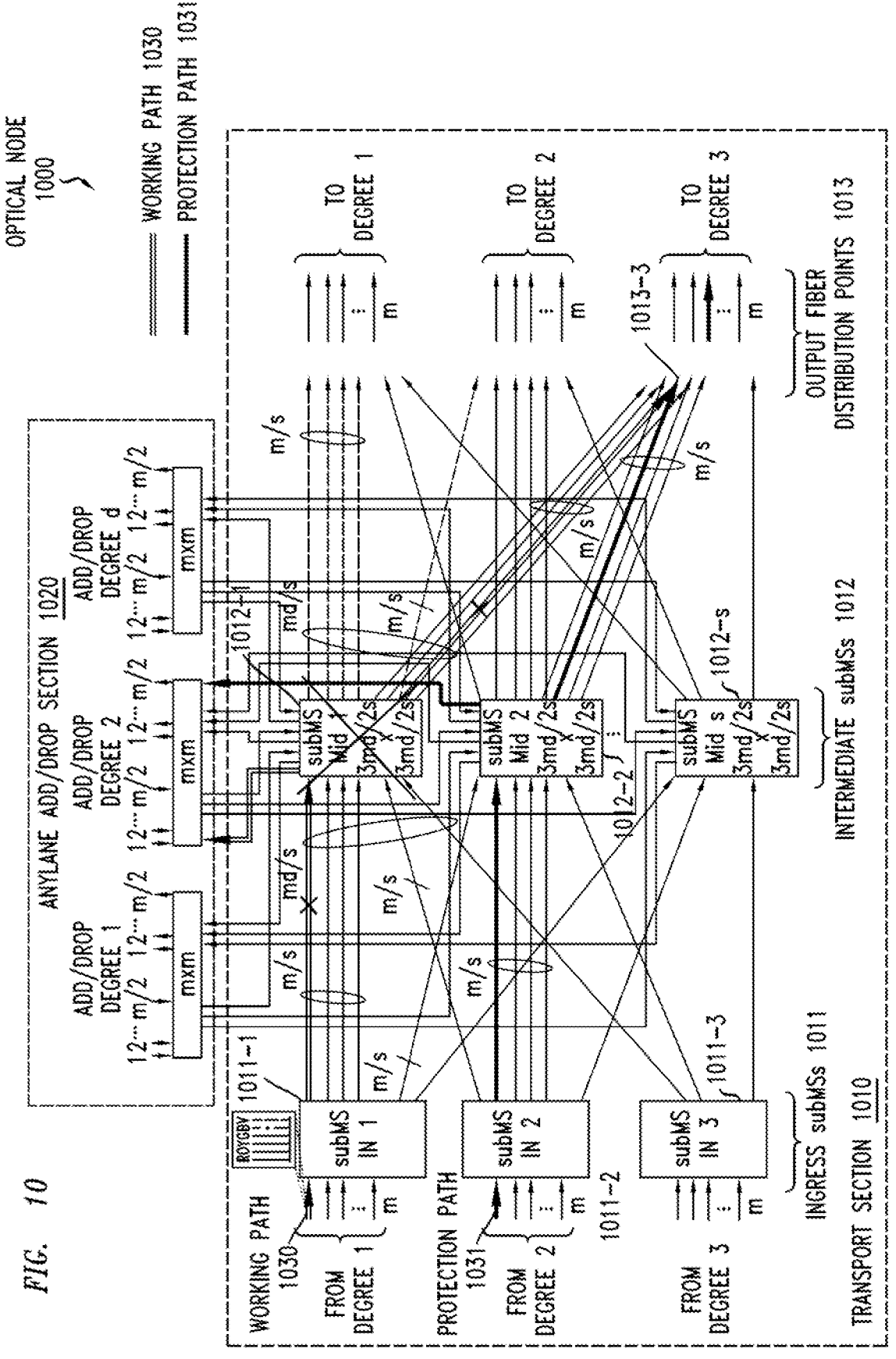
FIG. 10 depicts an example embodiment of an optical node, using a spatially-switched distributed Clos architecture with two stages of switching, that is configured to support through traffic while supporting node diverse working and protection paths as presented in FIG. 6 where there is a mid-stage switch failure in the two-stage spatially-switched distributed Clos architecture.

FIG. 10 depicts an example embodiment of an optical node, using a spatially-switched distributed Clos architecture with two stages of switching, that is configured to support through traffic while supporting node diverse working and protection paths as presented in FIG. 6 where there is a mid-stage switch failure in the two-stage spatially-switched distributed Clos architecture.

As depicted in FIG. 10, the optical node 1000 includes a transport section 1010 and an anylane add/drop section 1020. The transport section 1010 is spatially-switched distributed Clos architecture with two stages of switching (illustratively, using a set of ingress subMSs 1011, a set of intermediate subMSs 1012, and a set of output fiber distribution points 1013), similar to the transport section 410 of the optical node 400 of FIG. 4. The anylane add/drop section 1020 is similar to the anylane add/drop section 420 of the optical node 400 of FIG. 4.

As depicted in FIG. 10, the optical node 1000 supports diverse working and protection paths including a working path 1030 and an associated protection path 1031. The working path 1030 traverses the ingress subMS 1011-1 and the intermediate subMS 1012-1 that directs the working path 1030 to the third output fiber distribution point 1013-3. The protection path 1031 traverses the ingress subMS 1011-2 and the intermediate subMS 1012-2 that directs the working path 1030 to the third output fiber distribution point 1013-3.

As depicted in FIG. 10, the optical node 1000 is configured to support through traffic, while supporting node diverse working and protection paths, when there is a mid-stage switch failure in the two-stage spatially-switched distributed Clos architecture of the transport section 1010. As depicted in FIG. 10, when the intermediate subMS 1012-1 fails (as indicated by the "X" through the node), the working path 1030 is propagated from the ingress subMS 1011-1 toward the intermediate subMS 1012-1, but is no longer propagated from the intermediate subMS 1012-1 to the third output fiber distribution point 1013-3 (also denoted by an "X" on this section of the working path 1030). However, despite the failure of the intermediate subMS 1012-1, the protection path 1031 continues to flow via the ingress subMS 1011-2 and the intermediate subMS 1012-2 such that the associated optical signals may still pass through the optical node 1000 and exist the optical node 1000 via the third output fiber distribution point 1013-3 of the optical node 1000. Thus, the diverse routes for the working path 1030 and the protection path 1031 make these paths robust to input switch failure for optical signals passing through the optical node 1000.

Figure 11:
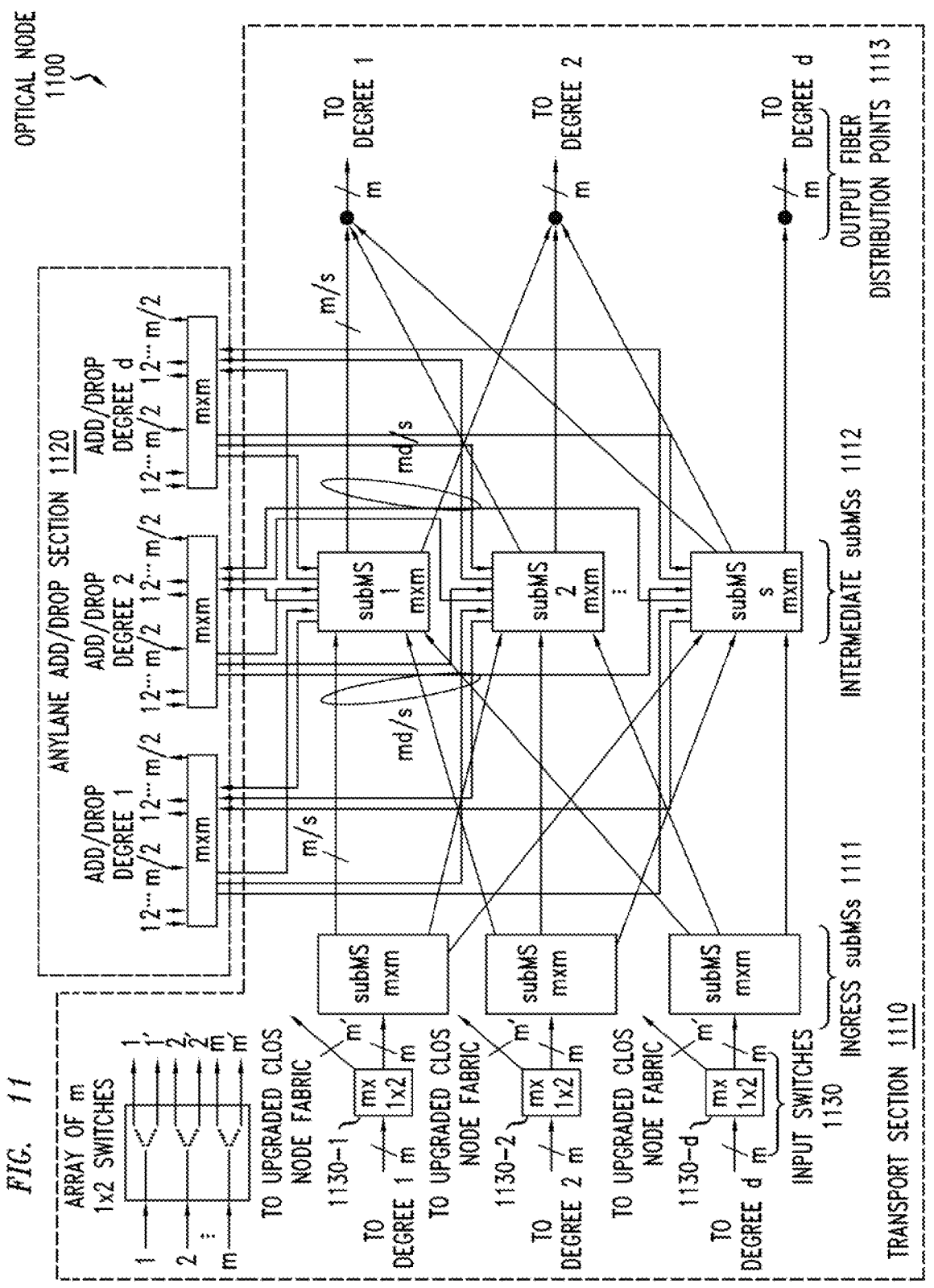
FIG. 11 depicts an example embodiment of an optical node, using a spatially-switched distributed Clos architecture with two stages of switching, which is configured to support upgrades to the optical node based on use of arrays of input 1×2 switches.

FIG. 11 depicts an example embodiment of an optical node, using a spatially-switched distributed Clos architecture with two stages of switching, which is configured to support upgrades to the optical node based on use of arrays of input 1×2 switches.

As depicted in FIG. 11, the optical node 1100 includes a transport section 1110 and an anylane add/drop section 1120. The transport section 1110 is spatially-switched distributed Clos architecture with two stages of switching (illustratively, using a set of ingress subMSs 1111, a set of intermediate subMSs 1112, and a set of output fiber distribution points 1113), similar to the transport section 410 of the optical node 400 of FIG. 4. The anylane add/drop section 1120 is similar to the anylane add/drop section 420 of the optical node 400 of FIG. 4.

As depicted in FIG. 11, the transport section 1110 includes a set of input switches 1130-1 to 1130-d (collectively, input switches 1130) disposed between the input fibers entering the transport section 1110 and the ingress subMSs 1111-1 to 1111-d, respectively. The mid-stage Clos switches (illustratively, intermediate subMSs 1112) are deployed to support a number of degrees (d) and fibers (m). The input switches 1130 enable increases in node capacity in d and/or m with reduced or minimal disruption of the existing optical connections.

As depicted in FIG. 11, each of the input switches 1130 is an array of m 1×2 switches, with m inputs and 2m outputs. The array of m 1×2 switches is depicted for input switch 1130-1 associated with Degree 1, but, for purposes of clarity, is omitted for input switches 1130-2 to 1130-d. As illustrated, for each of the m inputs received at an input switch 1130 for a given Degree, there are two corresponding outputs including a first output that is connected to the existing Clos node fabric of the optical node 1100 (illustratively, to the ingress subMS 1111 associated with that Degree) and a second output (denoted with a prime indicator) that is connected to the upgraded Clos node fabric to which the optical node 1100 is being transitioned (which is omitted for purposes of clarity). For example, the first input "1" is switched to an output "1" (connected to the existing Clos node fabric through connection to the corresponding ingress subMS 1111) and to an output "1'" (connected to the upgraded Clos node fabric to which the optical node 1100 is being transitioned (which is omitted for purposes of clarity), the second input "2" is switched to an output "2" (connected to the existing Clos node fabric through connection to the corresponding ingress subMS 1111) and to an output "2'" (connected to the upgraded Clos node fabric to which the optical node 1100 is being transitioned (which is omitted for purposes of clarity), and so forth, with the m-th input "m" being switched to an output "m" (connected to the existing Clos node fabric through connection to the corresponding ingress subMS 1111) and to an output "m'" (connected to the upgraded Clos node fabric to which the optical node 1100 is being transitioned (which is omitted for purposes of clarity).

As depicted in FIG. 11, the input switches 1130 enable upgrades to the optical node 1100 with reduced or even minimal disruption to the existing optical connections. The upgraded Clos node fabric can be installed on the secondary outputs of the input switches 1130 when the upgrade to the optical node 1100 is to be performed. Once the upgraded Clos node fabric has been installed, all of the active traffic can be switched over from the existing Clos node fabric to the upgraded Clos node fabric using the array of input switches 1130 with reduced or even minimal disruption. The existing Clos node fabric can then be removed. In this manner, as previously indicated, the input switches 1130 enable upgrades to the optical node 1100 with reduced or even minimal disruption to the existing optical connections.

It will be appreciated that, although primarily presented in FIG. 11 with respect to example embodiments in which the 1×2 switches are applied to the optical node 1100 at a particular location within the transport section 1110 (illustratively, as the input switches 1130), the 1×2 input switches also or alternatively may be applied to one or more other locations of the optical node 1100 (e.g., to one or more other locations within the transport section 1110, within the anylane add/drop section 1120, or the like, as well as various combinations thereof).

Figure 12:
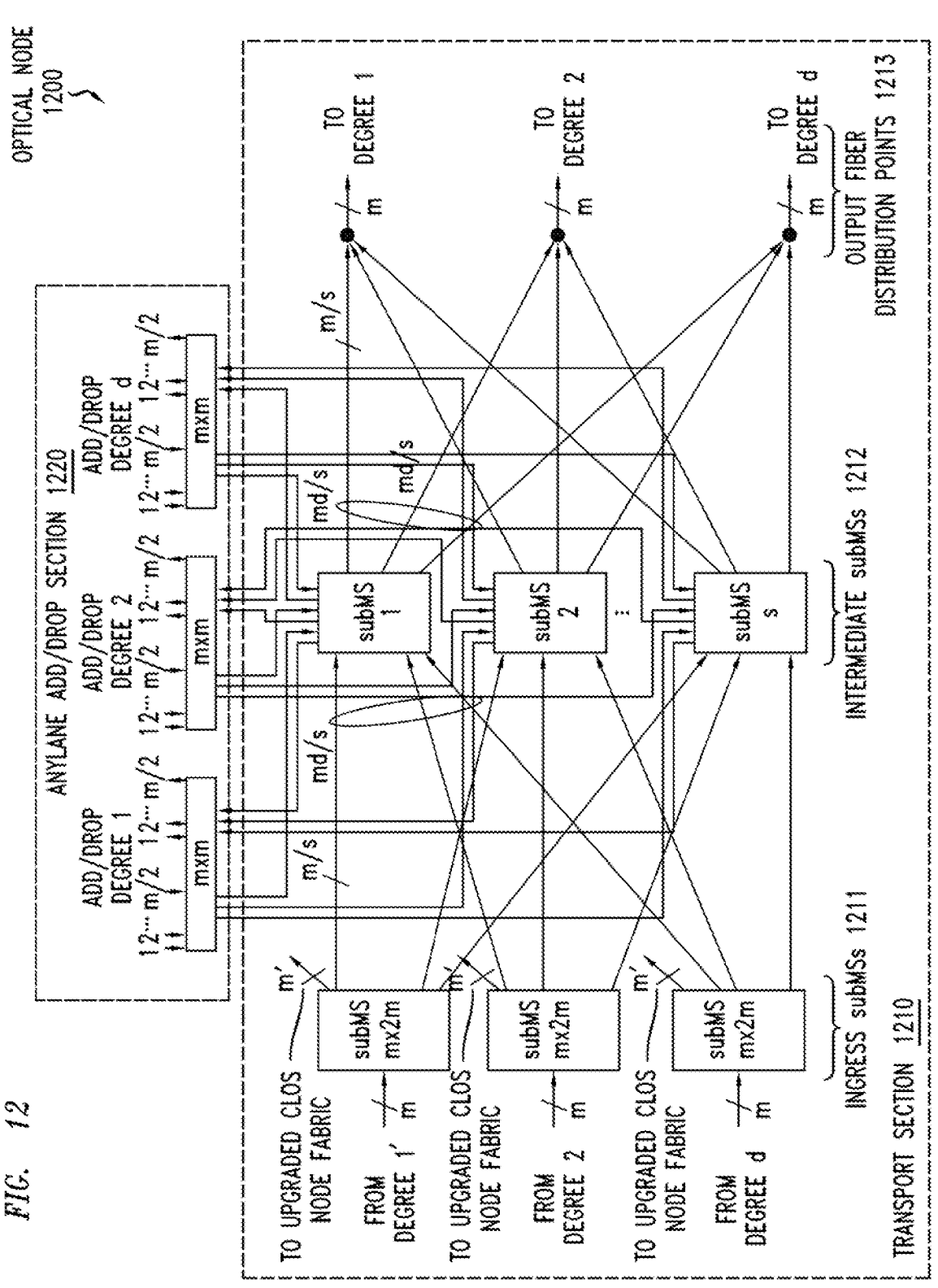
FIG. 12 depicts an example embodiment of an optical node, using a spatially-switched distributed Clos architecture with two stages of switching, which is configured to support upgrades to the optical node based on use of additional output ports on the input switches.

FIG. 12 depicts an example embodiment of an optical node, using a spatially-switched distributed Clos architecture with two stages of switching, which is configured to support upgrades to the optical node based on use of additional output ports on the input switches.

As depicted in FIG. 12, the optical node 1200 includes a transport section 1210 and an anylane add/drop section 1220. The transport section 1210 is spatially-switched distributed Clos architecture with two stages of switching (illustratively, using a set of ingress subMSs 1211, a set of intermediate subMSs 1212, and a set of output fiber distribution points 1213), similar to the transport section 410 of the optical node 400 of FIG. 4. The anylane add/drop section 1220 is similar to the anylane add/drop section 420 of the optical node 400 of FIG. 4.

As depicted in FIG. 12, each of the ingress subMSs 1211, rather than being implemented as an m×m switch (e.g. as in the optical node 400 of FIG. 4 and the optical node 1100 of FIG. 11), is implemented as an m×2 m switch. The mid-stage Clos switches (illustratively, intermediate subMSs 1212) are deployed to support a number of degrees (d) and fibers (m). The ingress subMSs 1211 enable increases in node capacity in d and/or m with reduced or minimal disruption of the existing optical connections.

As depicted in FIG. 12, each of the modified ingress subMSs 1211 has m inputs and 2 m outputs. The m inputs and the 2 m outputs from each of the ingress subMSs 1211 are depicted. As illustrated, for each of the m inputs received at an ingress subMS 1211 for a given Degree, there are two corresponding outputs including a first output that is connected to the existing Clos node fabric of the optical node 1200 (illustratively, one to each of the intermediate subMSs 1212) and a second output (denoted with a prime indicator) that is connected to the upgraded Clos node fabric to which the optical node 1200 is being transitioned (which is omitted for purposes of clarity).

As depicted in FIG. 12, the modified ingress subMSs 1211 enable upgrades to the optical node 1200 with reduced or even minimal disruption to the existing optical connections. The upgraded Clos node fabric can be installed on the secondary outputs of the input switches 1211 when the upgrade to the optical node 1200 is to be performed. Once the upgraded Clos node fabric has been installed, all of the active traffic can be switched over from the existing Clos node fabric to the upgraded Clos node fabric using the input switches 1211 with reduced or even minimal disruption. The existing Clos node fabric can then be removed. In this manner, as previously indicated, the input switches 1211 enable upgrades to the optical node 1200 with reduced or even minimal disruption to the existing optical connections.

Figure 13:
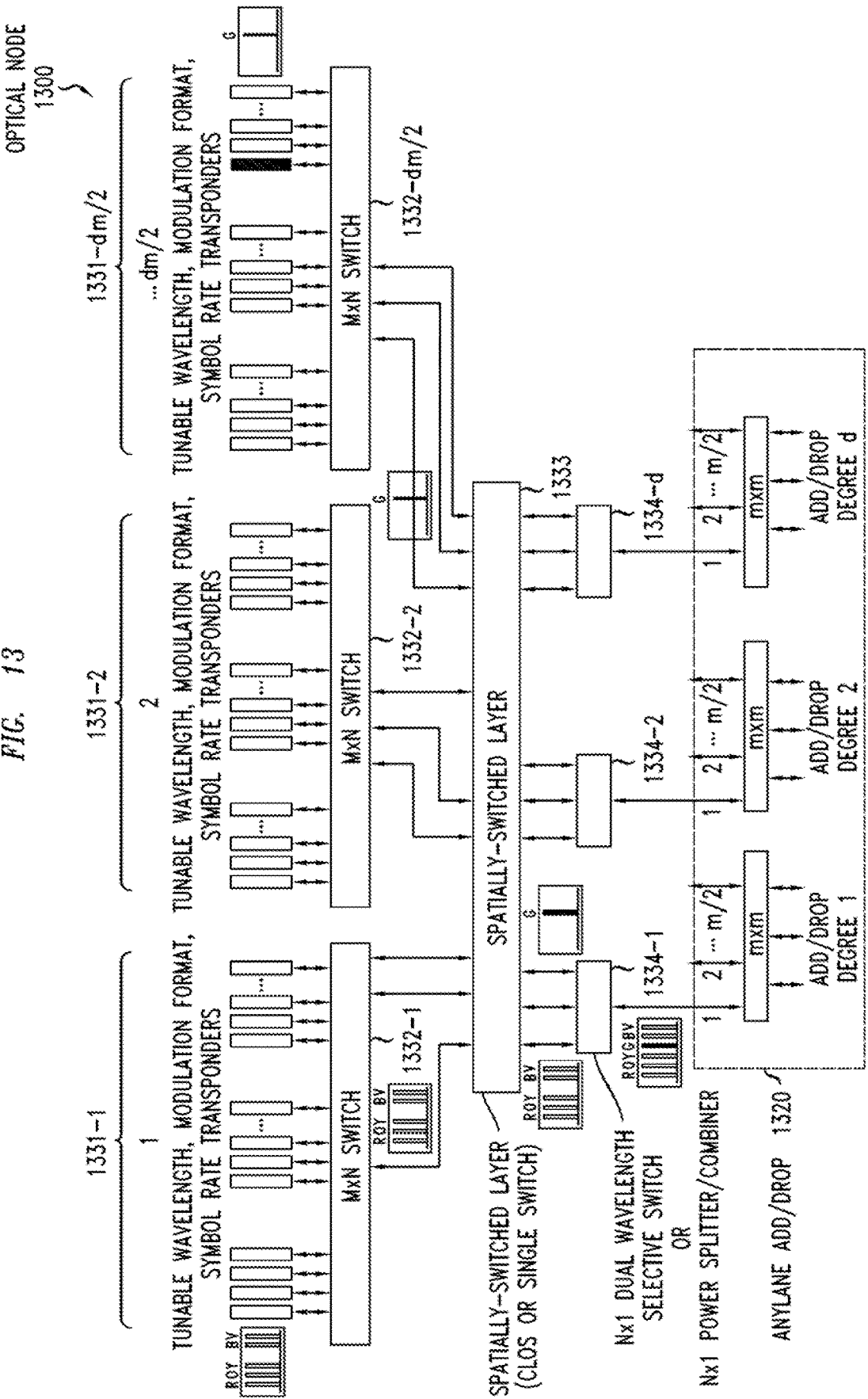
FIG. 13 depicts an example embodiment of an optical node, configured to support an anylane add/drop capability for SDM optical systems, which is configured to support flexible wavelength multiplexing at the anylane add/drop section.

FIG. 13 depicts an example embodiment of an optical node, configured to support an anylane add/drop capability for SDM optical systems, which is configured to support flexible wavelength multiplexing at the anylane add/drop section.

As depicted in FIG. 13, the optical node 1300 includes an anylane add/drop section 1320 as well as additional elements configured to support flexible wavelength multiplexing at the anylane add/drop section 1320. It will be appreciated that, although omitted for purposes of clarity, the optical node 1300 also may include a transport section (e.g., using one of the Clos node architectures as presented herein or any other suitable transport architecture).

As depicted in FIG. 13, the additional elements configured to support flexible wavelength multiplexing at the anylane add/drop section 1320 include a set of transponder sets 1331-1 to 1331-dm/2 (collectively, transponder sets 1331), a set of M×N switches 1332-1 to 1332-dm/2 (collectively, M×N switches 1332, which may be M×N dual multicast switches, M×N dual wavelength selective switches or any other suitable type(s) of M×N switches), a spatially-switched layer 1333, and a set of elements 1334-1 to 1334-dm/2 (collectively, elements 1334).

As depicted in FIG. 13, each of the degrees of the anylane add/drop section 1320 has associated therewith m/2 of the transponder sets 1331, respectively. For example, the first degree has the transponder set 1331-1 associated therewith, the second degree has the transponder set 1331-2 associated therewith, and so forth, with the d-th degree having the transponder set 1331-dm/2 associated therewith. The transponder sets 1331 each include N transponders that are tunable in wavelength, modulation format, and symbol rate. It is noted that the modulation format and symbol rate tunability may necessitate a flexible grid multiplexing/demultiplexing solution. It will be appreciated that, although primarily presented with respect to example embodiments in which there is an m/2:1 correspondence of multiplexing structures to degrees, any wavelength may go to any degree or fiber and, therefore, other types of correspondence of multiplexing structures to degrees and fibers may be supported.

As depicted in FIG. 13, the M×N switches 1332 interconnect the transponder sets 1331 and the spatially-switched layer 1333. For example, transponder set 1331-1 is connected to the M×N switch 1332-1, the transponder set 1331-2 is connected to the M×N switch 1332-2, and so forth, with the transponder set 1331-dm/2 being connected to the M×N switch 1332-dm/2). In the add direction, the optical signals of the N transponders are multiplexed before being provided to the spatially-switched layer 1333. In the drop direction, the multiplexed drop signal received from the spatially-switched layer 1333 is demultiplexed into optical signals for the transponders before being provided to the transponders. It will be appreciated that, although primarily presented with respect to example embodiments in which a switch layer is disposed between the transponders and the spatially-switched layer (illustratively, the layer of M×N switches 1332 is disposed between the transponder sets 1331 and the spatially-switched layer 1333), in at least some example embodiments the switch layer may be omitted and the transponders may be directly connected to the spatially-switched layer.

As depicted in FIG. 13, the spatially-switched layer 1333 interconnects the M×N switches 1332 and the elements 1334. The spatially-switched layer 1333 may be a strictly non-blocking Clos or a single switch.

As depicted in FIG. 13, the elements 1334 interconnect the spatially-switched layer 1333 and the add/drop degrees of the anylane add/drop section 1320. For example, element 1334-1 is connected to the first add/drop degree of the anylane add/drop section 1320, element 1334-2 is connected to the second add/drop degree of the anylane add/drop section 1320, and so forth, with the element 1334-dm/2 being connected to the d-th add/drop degree of the anylane add/drop section 1320. The elements 1334 may be implemented as N×1 dual wavelength selective switches, N×1 power splitters/combiners, or the like, as well as various combinations thereof.

As depicted in FIG. 13, the wavelengths are processed by the M×N switches 1332, the spatially-switched layer 1333, and the elements 1334 so that any wavelength from any transponder can be combined with any other wavelength from any other transponder. This is illustrated in FIG. 13, with the four indicated wavelengths from the transponder set 1331-1 (the four leftmost transponders in the set) and the indicated wavelength from the transponder set 1331-dm/2 (the fourth from the right) being combined and sent over the first fiber of the ADD/DROP degree 1). The wavelength superchannels are then transported by the SDM transport system by interfacing to the anylane add/drop switches of the anylane add/drop section 1320.

Figure 14:
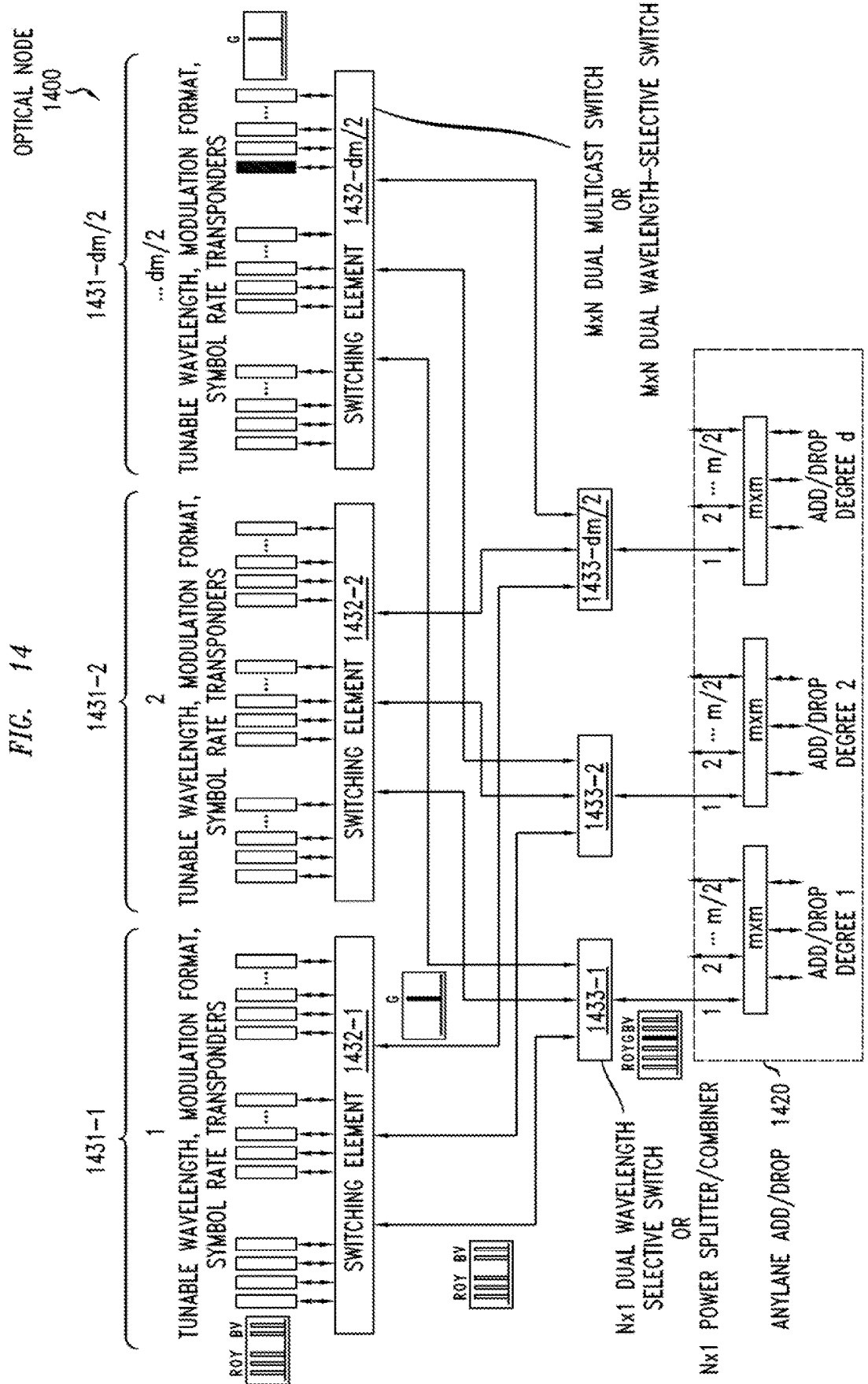
FIG. 14 depicts an example embodiment of an optical node, configured to support an anylane add/drop capability for SDM optical systems, which is configured to support flexible wavelength multiplexing at the anylane add/drop section.

FIG. 14 depicts an example embodiment of an optical node, configured to support an anylane add/drop capability for SDM optical systems, which is configured to support flexible wavelength multiplexing at the anylane add/drop section.

As depicted in FIG. 14, the optical node 1400 includes an anylane add/drop section 1420 as well as additional elements configured to support flexible wavelength multiplexing at the anylane add/drop section 1420. It will be appreciated that, although omitted for purposes of clarity, the optical node 1400 also may include a transport section (e.g., using one of the Clos node architectures as presented herein or any other suitable transport architecture).

As depicted in FIG. 14, the additional elements configured to support flexible wavelength multiplexing at the anylane add/drop section 1420 include a set of transponder sets 1431-1 to 1431-dm/2 (collectively, transponder sets 1431), a set of switching elements 1432-1 to 1432-dm/2 (collectively, switching elements 1432), and a set of elements 1433-1 to 1433-dm/2 (collectively, elements 1433).

As depicted in FIG. 14, each of the degrees of the anylane add/drop section 1420 has associated therewith m/2 of the transponder sets 1431, respectively. For example, the first degree has the transponder set 1431-1 associated therewith, the second degree has the transponder set 1431-2 associated therewith, and so forth, with the d-th degree having the transponder set 1431-dm/2 associated therewith. The transponder sets 1431 each include N transponders that are tunable in wavelength, modulation format, and symbol rate. It is noted that the modulation format and symbol rate tunability necessitates a flexible grid multiplexing/demultiplexing solution. It will be appreciated that, although primarily presented with respect to example embodiments in which there is an m/2:1 correspondence of transponder sets to degrees of the anylane add/drop section, any wavelength may go to any degree and, therefore, other types of correspondence of transponder sets to degrees of the anylane add/drop section may be supported.

As depicted in FIG. 14, the switching elements 1432 interconnect the transponder sets 1431 and the elements 1433. For example, transponder set 1431-1 is connected to the switching element 1432-1, the transponder set 1431-2 is connected to the switching element 1432-2, and so forth, with the transponder set 1431-dm/2 being connected to the switching element 1432-dm/2). The switching elements 1432 may be implemented as M×N dual multicast switches, M×N dual wavelength-selective switches, or the like, as well as various combinations thereof.

As depicted in FIG. 14, the elements 1433 interconnect the switching elements 1432 and the add/drop degrees of the anylane add/drop section 1420. For example, element 1433-1 is connected to the first add/drop degree of the anylane add/drop section 1420, element 1433-2 is connected to the second add/drop degree of the anylane add/drop section 1420, and so forth, with the element 1433-dm/2 being connected to the d-th add/drop degree of the anylane add/drop section 1420. The elements 1433 may be implemented as N×1 dual wavelength selective switches, N×1 power splitters/combiners, or the like, as well as various combinations thereof.

As depicted in FIG. 14, the wavelengths are processed by the switching elements 1432 and the elements 1433 so that any wavelength from any transponder can be combined with any other wavelength from any other transponder. This is illustrated in FIG. 14, with the four indicated wavelengths from the transponder set 1431-1 (the four leftmost transponders in the set) and the indicated wavelength from the transponder set 1431-dm/2 (the fourth transponder from the right) being combined and sent over the first fiber of the ADD/DROP degree 1). The wavelength superchannels are then transported by the SDM transport system by interfacing to the anylane add/drop switches of the anylane add/drop section 1420.

Figure 15:
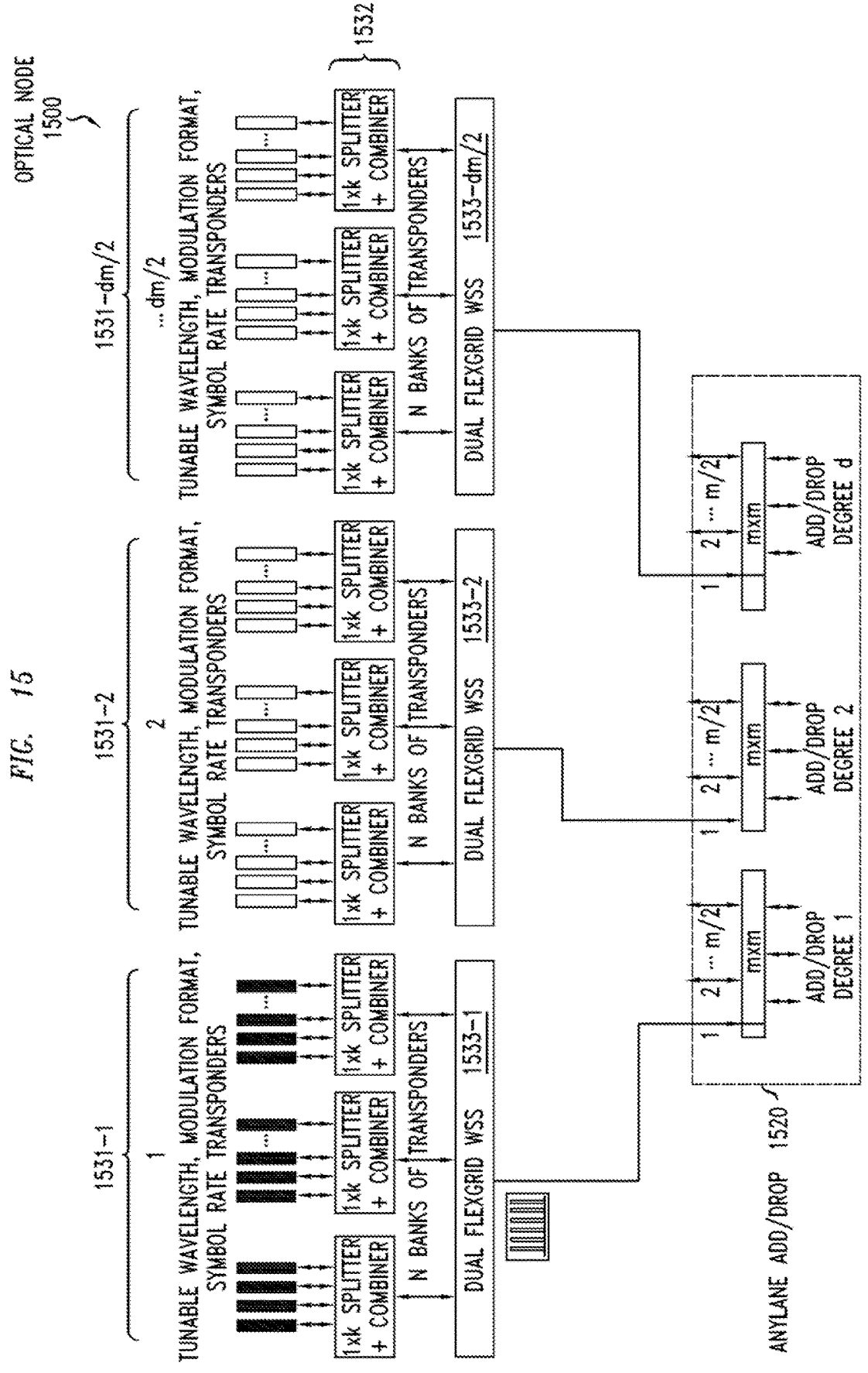
FIG. 15 depicts an example embodiment of an optical node, configured to support an anylane add/drop capability for SDM optical systems, which is configured to support flexible wavelength multiplexing at the anylane add/drop section.

FIG. 15 depicts an example embodiment of an optical node, configured to support an anylane add/drop capability for SDM optical systems, which is configured to support flexible wavelength multiplexing at the anylane add/drop section.

As depicted in FIG. 15, the optical node 1500 includes an anylane add/drop section 1520 as well as additional elements configured to support flexible wavelength multiplexing at the anylane add/drop section 1520. It will be appreciated that, although omitted for purposes of clarity, the optical node 1500 also may include a transport section (e.g., using one of the Clos node architectures as presented herein or any other suitable transport architecture).

As depicted in FIG. 15, the additional elements configured to support flexible wavelength multiplexing at the anylane add/drop section 1520 include a set of transponder sets 1531-1 to 1531-dm/2 (collectively, transponder sets 1531), a set of splitter/combiner sets 1532, and a set of dual flexgrid wavelength selective switches 1533-1 to 1533-dm/2 (collectively, dual flexgrid wavelength selective switches 1533).

As depicted in FIG. 15, each of the degrees of the anylane add/drop section 1520 has associated therewith m/2 of the transponder sets 1531, respectively. For example, the first degree has the transponder set 1531-1 associated therewith, the second degree has the transponder set 1531-2 associated therewith, and so forth, with the d-th degree having the transponder set 1531-dm/2 associated therewith. The transponder sets 1531 each include N banks of k transponders (for a total of N×k transponders) that are tunable in wavelength, modulation format, and symbol rate. It is noted that the modulation format and symbol rate tunability necessitates a flexible grid multiplexing/demultiplexing solution.

As depicted in FIG. 15, the splitter/combiner sets 1532-1 to 1532-dm/2 interconnect the transponder sets 1531 and the dual flexgrid wavelength selective switches 1533. For example, the splitter/combiner set 1532-1 connects the N banks of k transponders in the transponder set 1531-1 to the dual flexgrid wavelength selective switch 1533-1, the splitter/combiner set 1532-2 connects the N banks of k transponders in the transponder set 1531-2 to the dual flexgrid wavelength selective switch 1533-2, and so forth, with the splitter/combiner set 1532-dm/2 connecting the N banks of k transponders in the transponder set 1531-dm/2 to the dual flexgrid wavelength selective switch 1533-dm/2.

As depicted in FIG. 15, the dual flexgrid wavelength selective switches 1533 interconnect the splitter/combiner sets 1532 and the add/drop degrees of the anylane add/drop section 1520. For example, dual flexgrid wavelength selective switch 1533-1 is connected to the first add/drop degree of the anylane add/drop section 1520, the dual flexgrid wavelength selective switch 1533-2 is connected to the second add/drop degree of the anylane add/drop section 1520, and so forth, with the dual flexgrid wavelength selective switch 1533-dm/2 being connected to the d-th add/drop degree of the anylane add/drop section 1520.

As depicted in FIG. 15, any group can still be added/dropped to any degree and fiber due to the anylane add/drop section 1520, but transponders from different WS S groups cannot be rearranged. This can have disadvantages in a dynamic networking scenario with different path lengths, as an optimal configuration could require a different number of transponders in a fiber depending on the reach; however, as the cost of transponders reduces, or for more uniform networks, this configuration is simpler due to requiring fewer optical components.

It will be appreciated that, although primarily presented with respect to example embodiments in which the multiple spatial lanes for SDM are provided using bundles of uncoupled single-mode fibers (e.g., where the single-mode fibers are coupled to the inputs and outputs of the subMSs in the anylane add/drop section), the multiple spatial lanes for SDM optical systems supporting such example embodiments may be implemented in various ways. For example, the multiple spatial lanes may be provided using cables that bundle multiple strands of uncoupled single-mode fibers, using fibers that include multiple uncoupled cores, or the like, as well as various combinations thereof. For example, where multi-core optical fibers are used for spatial lanes, fan-in-fan-out (FIFO) devices may be used to adapt the subMSs of the anylane add/drop section to use of the multi-core optical fibers.

It will be appreciated that, although primarily presented with respect to specific configurations of the optical nodes that support optical switching of optical communications at the lane level (e.g., between fibers or fiber cores thereof), various optical nodes configured to support optical switching of optical communications at the lane level may be described more generally. For example, an apparatus may include an optical node (e.g., an optical add/drop node, a spatial multiplexer, or the like) configured to optically switch optical communications between near ends of optical fibers or optical cores thereof. For example, an apparatus may include an optical node (e.g., an optical add/drop node, a spatial multiplexer, or the like) configured to optically switch optical communications between near ends of optical fibers or optical cores such that, for selected pairs of the optical fibers, an entire set of optical wavelength channels received at the optical add-drop multiplexer from a first of the optical fibers or the optical cores thereof of each one of the selected pairs of the optical fibers is directed together to a second of the optical fibers or the optical cores thereof of the same one of the selected pairs of the optical fibers. For example, the optical node may be configured to selectively drop an entire set of optical wavelength channels received from selected ones of the optical fibers or the optical cores thereof and to add sets of optical wavelength channels to selected others of the optical fibers or the optical cores thereof such that the added sets are the wavelength channels carried by the selected others. For example, the optical node may include a multi-stage structure of optical switches (e.g., a Clos network of optical switches, such as a Clos network as presented in any of FIGS. 3-5 or other suitable type of Clos network architecture). For example, the multi-stage structure of optical switches may include, at least, a first ingress and/or egress layer of optical switches, a second ingress and/or egress layer of optical switches, and a first intermediate layer of optical switches connecting the first and second ingress and/or egress layers of optical switches. For example, the multi-stage structure of optical switches may include a second intermediate layer of optical switches connecting the first intermediate layer of optical switches to the second ingress and/or egress layer of optical switches. For example, the apparatus may further include a plurality of optical transceivers, where each optical transceiver is connected to receive and transmit optical signals to a remote end of a corresponding pair of the optical fibers or a corresponding pair of the optical cores over a plurality of optical wavelength channels.

It will be appreciated that, although primarily presented with respect to specific functions performed by the optical nodes that support optical switching of optical communications at the lane level (e.g., between fibers or fiber cores thereof), various functions performed by optical nodes configured to support optical switching of optical communications at the lane level may be described more generally. For example, a method may include optically directing optical communications between near ends of optical fibers or optical cores thereof. FIG. 16 depicts an example embodiment of a method for use in optically directing optical communications between optical fibers. At block 1601, the method 1600 begins. At block 1610, for a plurality of pairs of optical fibers, optically directing optical communications between near ends of the optical fibers such that an entire set of optical wavelength channels received at the optical add-drop multiplexer from a first of the optical fibers or the optical cores thereof of a first optical fiber of one of the selected pairs of the optical fibers is directed together to a second of the optical fibers or the optical cores thereof of the same one of the selected pairs of optical fibers. At block 1699, the method 1600 ends. For example, the method 1600 may further include, at the add-drop multiplexer, selectively dropping an entire set of optical wavelength channels received from selected ones of the optical fibers or the optical cores thereof. For example, the method 1600 may further include, at the add-drop multiplexer, adding sets of optical wavelength channels to selected others of the optical fibers or the optical cores thereof such that that added sets are the wavelength channels carried by the selected others. For example, the optically directing may include transmitting the optical communications through a multi-stage structure of optical switches (e.g., a Clos network of optical switches, such as a Clos network as presented in any of FIGS. 3-5 or any other suitable type of Clos network architecture). For example, the optically directing may include optically transmitting the optical communications through a first ingress and/or egress layer of optical switches, a second ingress and/or egress layer of optical switches, and a first intermediate layer of optical switches connecting the first and second ingress and/or egress layers of optical switches. For example, the optically directing may include directing the optical communications through a second intermediate layer of optical switches connecting the first intermediate layer of optical switches to the second ingress and/or egress layer of optical switches. For example, the method 1600 may further include communicating, by at least one of a plurality of optical transceivers, optical signals to a remote end of a corresponding pair of the optical fibers or a corresponding pair of the optical cores over a plurality of optical wavelength channels.

Various example embodiments for supporting an anylane add/drop capability for SDM optical systems may provide various advantages or potential advantages. For example, various example embodiments for supporting an anylane add/drop capability for SDM optical systems may simplify management of optical nodes since specific add/drop ports do not need to be assigned to certain fibers to guarantee reachability to transponders on other optical nodes. For example, various example embodiments for supporting an anylane add/drop capability for SDM optical systems may support flexible optical networking since optical signals can be rerouted on different fibers and directions as needed. For example, various example embodiments for supporting an anylane add/drop capability for SDM optical systems may obviate the need for demultiplexing all of the wavelengths at the input, sending individual wavelengths to each port of spatial switches, and multiplexing the wavelengths back together again to send them on single fibers, thereby reducing the number of space switches and, thus, reducing various costs associated with supporting SDM optical systems. For example, various example embodiments for supporting an anylane add/drop capability for SDM optical systems may support reductions in the blocking probability of paths between transponders. For example, various example embodiments for supporting an anylane add/drop capability for SDM optical systems may support reductions in OPEX by reducing or even eliminating the need for use of manual node configurations in order to achieve reachability between available transponders on interconnected nodes. It will be appreciated that various example embodiments for supporting an anylane add/drop capability for SDM optical systems may provide various other advantages or potential advantages.

Figure 17:
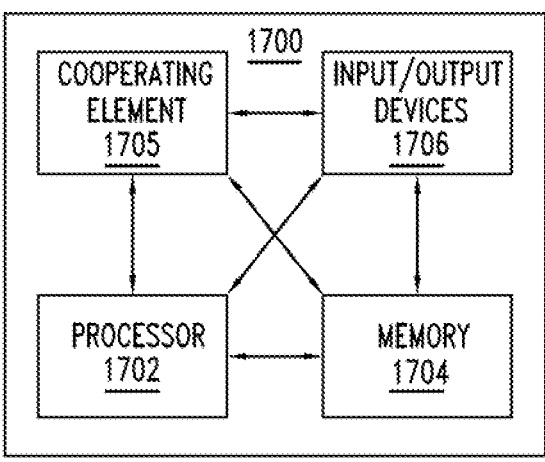
FIG. 17 depicts an example embodiment of a computer suitable for use in performing various functions presented herein.

FIG. 17 depicts an example embodiment of a computer suitable for use in performing various functions presented herein.

The computer 1700 includes a processor 1702 (e.g., a central processing unit (CPU), a processor, a processor having a set of processor cores, a processor core of a processor, or the like) and a memory 1704 (e.g., a random access memory, a read only memory, or the like). The processor 1702 and the memory 1704 may be communicatively connected. In at least some example embodiments, the computer 1700 may include at least one processor and at least one memory including instructions that, when executed by the at least one processor, cause the computer to perform various functions presented herein.

The computer 1700 also may include a cooperating element 1705. The cooperating element 1705 may be a hardware device. The cooperating element 1705 may be a process (e.g., computer program code and associated data structures) that can be loaded into the memory 1704 and executed by the processor 1702 to implement various functions presented herein (in which case, for example, the cooperating element 1705 (including associated data structures) can be stored on a non-transitory computer-readable storage medium, such as a storage device or other suitable type of storage element (e.g., a magnetic drive, an optical drive, or the like)).

The computer 1700 also may include one or more input/output devices 1706. The input/output devices 1706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1700 may represent a general architecture and functionality suitable for implementing functional elements described herein, portions of functional elements presented herein, combinations of functional elements presented herein, or the like, as well as various combinations thereof. For example, computer 1700 may provide a general architecture and functionality that is suitable for implementing one or more devices presented herein, such as an optical node or portion thereof, a controller or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer program code, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:

an optical add-drop multiplexer configured to optically switch optical communications between near ends of optical fibers or optical cores such that, for selected pairs of the optical fibers, an entire set of optical wavelength channels received at the optical add-drop multiplexer from a first of the optical fibers or a first of the optical cores thereof of each one of the selected pairs of the optical fibers is directed together to a second of the optical fibers or a second of the optical cores thereof of the same one of the selected pairs of the optical fibers, wherein the optical add-drop multiplexer comprises:

a transport section comprising a first plurality of optical switches configured to optically switch optical communications between near ends of optical fibers or optical cores thereof such that entire sets of optical wavelength channels received from ones of the optical fibers or the optical cores thereof are directed together to others of the optical fibers or the optical cores thereof; and an add-drop section comprising a second plurality of optical switches configured to drop entire sets of optical wavelength channels from selected ones of the optical fibers or the optical cores thereof and to add entire sets of optical wavelength channels to selected others of the optical fibers or the optical cores thereof, wherein each of the optical switches in the second plurality of optical switches is optically connected to each of the optical switches in the first plurality of optical switches such that any of the sets of optical wavelength channels being dropped is dropped together from one of the optical fibers or the optical cores thereof and such that any of the sets of optical wavelength channels being added is added together to one of the optical fibers or the optical cores thereof.

2. The apparatus of claim 1, wherein the optical add-drop multiplexer is configured to selectively drop an entire set of optical wavelength channels received from selected ones of the optical fibers or the optical cores thereof and to add sets of optical wavelength channels to selected others of the optical fibers or the optical cores thereof such that the added sets are the wavelength channels carried by the selected others.

3. The apparatus of claim 1, wherein the optical add-drop multiplexer comprises a multi-stage structure of optical switches therein.

4. The apparatus of claim 3, wherein the multi-stage structure includes a Clos network of optical switches.

5. The apparatus of claim 3, wherein the multi-stage structure includes, at least, a first ingress and/or egress layer of optical switches, a second ingress and/or egress layer of optical switches, and a first intermediate layer of optical switches connecting the first and second ingress and/or egress layers of optical switches.

6. The apparatus of claim 5, wherein the multi-stage structure includes a second intermediate layer of optical switches connecting the first intermediate layer of optical switches to the second ingress and/or egress layer of optical switches.

7. The apparatus of claim 1, further comprising:

the optical fibers; and a plurality of optical transceivers, each optical transceiver being connected to receive and transmit optical signals to a remote end of a corresponding pair of the optical fibers or a corresponding pair of the optical cores over a plurality of optical wavelength channels.

8. An apparatus, comprising:

an optical add-drop multiplexer configured to optically switch optical communications between near ends of optical fibers or optical cores such that, for selected pairs of the optical fibers, an entire set of optical wavelength channels received at the optical add-drop multiplexer from a first of the optical fibers or a first of the optical cores thereof of each one of the selected pairs of the optical fibers is directed together to a second of the optical fibers or a second of the optical cores thereof of the same one of the selected pairs of the optical fibers, wherein the optical add-drop multiplexer comprises:

a transport section comprising a first plurality of optical switches and a second plurality of optical switches, wherein the first plurality of optical switches is optically connected to near ends of input optical fibers or optical cores thereof and optically connected to the second plurality of optical switches, wherein the second plurality of optical switches is configured to optically switch optical communications between the first plurality of optical switches and near ends of optical output fibers or optical cores thereof, wherein the first plurality of optical switches and the second plurality of optical switches are configured to optically switch optical communications between near ends of optical fibers or optical cores thereof such that entire sets of optical wavelength channels received from ones of the input optical fibers or the optical cores thereof are directed together to ones of the output optical fibers or the optical cores thereof; and an add-drop section comprising a third plurality of optical switches configured to drop entire sets of optical wavelength channels from selected ones of the input optical fibers or the optical cores thereof and to add entire sets of optical wavelength channels to selected ones of the output optical fibers or the optical cores thereof, wherein each of the optical switches in the third plurality of optical switches is optically connected to each of the optical switches in the second plurality of optical switches such that any of the sets of optical wavelength channels being dropped is dropped together from one of the input optical fibers or the optical cores thereof and such that any of the sets of optical wavelength channels being added is added together to one of the output optical fibers or the optical cores thereof.

9. An apparatus, comprising:

an optical add-drop multiplexer configured to optically switch optical communications between near ends of optical fibers or optical cores such that, for selected pairs of the optical fibers, an entire set of optical wavelength channels received at the optical add-drop multiplexer from a first of the optical fibers or a first of the optical cores thereof of each one of the selected pairs of the optical fibers is directed together to a second of the optical fibers or a second of the optical cores thereof of the same one of the selected pairs of the optical fibers, wherein the optical add-drop multiplexer comprises:

a transport section comprising a first plurality of optical switches, a second plurality of optical switches, and a third plurality of optical switches;

wherein the first plurality of optical switches is optically connected to near ends of input optical fibers or optical cores thereof and optically connected to the second plurality of optical switches, wherein the third plurality of optical switches is optically connected to the second plurality of optical switches and near ends of output optical fibers or optical cores thereof, wherein the second plurality of optical switches is optically connected to the first plurality of optical switches and the third plurality of optical switches;

wherein the first, second, and third pluralities of optical switches are configured to optically switch optical communications between near ends of optical fibers or optical cores thereof such that entire sets of optical wavelength channels received from ones of the input optical fibers or the optical cores thereof are directed together to ones of the output optical fibers or the optical cores thereof; and wherein the first, second, and third pluralities of optical switches are configured to drop entire sets of optical wavelength channels from selected ones of the input optical fibers or the optical cores thereof and to add entire sets of optical wavelength channels to selected ones of the output optical fibers or the optical cores thereof.

10. The apparatus of claim 9, wherein the third plurality of optical switches is configured to drop entire sets of optical wavelength channels from selected ones of the input optical fibers or the optical cores thereof to corresponding drop fibers or optical cores thereof supported by each of the optical switches in the third plurality of optical switches.

11. The apparatus of claim 9, wherein the first plurality of optical switches is configured to add entire sets of optical wavelength channels to selected ones of the output optical fibers or the optical cores thereof from corresponding add fibers or optical cores thereof supported by each of the optical switches in the first plurality of optical switches.

12. The apparatus of claim 9, wherein the third plurality of optical switches is configured to drop entire sets of optical wavelength channels from selected ones of the input optical fibers or the optical cores thereof to corresponding drop fibers or optical cores thereof supported by each of the optical switches in the third plurality of optical switches, wherein the first plurality of optical switches is configured to add entire sets of optical wavelength channels to selected ones of the output optical fibers or the optical cores thereof from corresponding add fibers or optical cores thereof supported by each of the optical switches in the first plurality of optical switches.

* * * * *